(12) United States Patent
Poulos et al.

(10) Patent No.: US 11,966,510 B2
(45) Date of Patent: Apr. 23, 2024

(54) OBJECT ENGAGEMENT BASED ON FINGER MANIPULATION DATA AND UNTETHERED INPUTS

(71) Applicant: Apple Inc., Cupertino, CA (US)

(72) Inventors: Adam G. Poulos, Saratoga, CA (US); Aaron M. Burns, Sunnyvale, CA (US); Arun Rakesh Yoganandan, San Francisco, CA (US); Benjamin R. Blachnitzky, San Francisco, CA (US); Nicolai Georg, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/114,492

(22) Filed: Feb. 27, 2023

(65) Prior Publication Data
US 2023/0315202 A1 Oct. 5, 2023

Related U.S. Application Data

(63) Continuation of application No. PCT/US2021/043312, filed on Jul. 27, 2021.

(60) Provisional application No. 63/107,287, filed on Oct. 29, 2020, provisional application No. 63/072,795, filed on Aug. 31, 2020.

(51) Int. Cl.
*G06F 3/01* (2006.01)
(52) U.S. Cl.
CPC .............. *G06F 3/014* (2013.01); *G06F 3/013* (2013.01); *G06F 3/017* (2013.01)
(58) Field of Classification Search
CPC ........... G06F 3/014; G06F 3/013; G06F 3/017
See application file for complete search history.

(56) References Cited

U.S. PATENT DOCUMENTS 10,146,316 B2   12/2018   Mishra et al.
10,417,827 B2   9/2019   Pahud et al.
(Continued)

FOREIGN PATENT DOCUMENTS

KR   20200081529 A   7/2020

OTHER PUBLICATIONS

PCT International Search Report and Written Opinion dated Nov. 18, 2021, PCT International Application No. PCT/US2021/043312, pp. 1-12.

*Primary Examiner* — Sejoon Ahn
(74) *Attorney, Agent, or Firm* — Fernando & Partners, LLP

(57) ABSTRACT

A method includes displaying a plurality of computer-generated objects, and obtaining finger manipulation data from a finger-wearable device via a communication interface. In some implementations, the method includes receiving an untethered input vector that includes a plurality of untethered input indicator values. Each of the plurality of untethered input indicator values is associated with one of a plurality of untethered input modalities. In some implementations, the method includes obtaining proxy object manipulation data from a physical proxy object via the communication interface. The proxy object manipulation data corresponds to sensor data associated with one or more sensors integrated in the physical proxy object. The method includes registering an engagement event with respect to a first one of the plurality of computer-generated objects based on a combination of the finger manipulation data, the untethered input vector, and the proxy object manipulation data.

20 Claims, 27 Drawing Sheets

(56) References Cited

U.S. PATENT DOCUMENTS

| | | |
|---|---|---|
| 10,599,393 B2 | 3/2020 | Murillo et al. |
| 2011/0148669 A1 | 6/2011 | Kang et al. |
| 2015/0177836 A1 | 6/2015 | Ouchi et al. |
| 2019/0064927 A1 | 2/2019 | Tachi et al. |
| 2019/0243428 A1* | 8/2019 | Liu .......................... G07G 1/01 |
| 2019/0243456 A1* | 8/2019 | Han ...................... G06F 1/1686 |
| 2019/0243460 A1* | 8/2019 | Shigeta ................. G06F 3/0425 |
| 2019/0243461 A1* | 8/2019 | Yamazaki ............. G06T 19/006 |
| 2019/0243469 A1* | 8/2019 | Kuribayashi ....... G06F 3/04817 |
| 2019/0244416 A1* | 8/2019 | Tamaoki ................ G09G 5/377 |
| 2020/0033944 A1 | 1/2020 | Kiemele et al. |
| 2020/0082637 A1 | 3/2020 | Powderly et al. |

* cited by examiner

US 11,966,510 B2

OBJECT ENGAGEMENT BASED ON FINGER MANIPULATION DATA AND UNTETHERED INPUTS

CROSS-REFERENCE TO RELATED APPLICATIONS

This application is a continuation of Intl. Patent App. No. PCT/US2021/043312, filed on Jul. 27, 2021, which claims priority to U.S. Provisional Patent App. No. 63/072,795, filed on Aug. 31, 2020, and U.S. Provisional Patent App. No. 63/107,287, filed on Oct. 29, 2020, which are all hereby incorporated by reference in their entirety.

TECHNICAL FIELD

The present disclosure relates to displaying computer-generated content, and in particular engaging with the computer-generated content based on various inputs.

BACKGROUND

An electronic device, including an integrated input system, may manipulate the display of a computer-generated object based on an input from the integrated input system. For example, the integrated input system corresponds to one of an extremity tracking input system or an eye tracking input system. However, utilizing an input from an integrated input system in order to manipulate a computer-generated object introduces a number of issues, such as tracking inaccuracies and limited user control for manipulating the computer-generated object.

SUMMARY

In accordance with some implementations, a method is performed at an electronic device with one or more processors, a non-transitory memory, a display, an untethered input detection system, and a communication interface provided to communicate with a finger-wearable device. The method includes displaying, on the display, a plurality of computer-generated objects. The method includes receiving, via the untethered input detection system, an untethered input vector that includes a plurality of untethered input indicator values. Each of the plurality of untethered input indicator values is associated with one of a plurality of untethered input modalities. The method includes obtaining finger manipulation data from the finger-wearable device via the communication interface. The method includes registering an engagement event with respect to a first one of the plurality of computer-generated objects based on at least a portion of the untethered input vector and the finger manipulation data.

In accordance with some implementations, a method is performed at an electronic device with one or more processors, a non-transitory memory, a display, and a communication interface provided to communicate with a finger-wearable device and with a physical proxy object. The method includes displaying, on the display, a plurality of computer-generated objects. The method includes obtaining proxy object manipulation data from the physical proxy object via the communication interface. The proxy object manipulation data corresponds to sensor data associated with one or more sensors integrated in the physical proxy object. The method includes obtaining finger manipulation data from the finger-wearable device via the communication interface. The method includes registering an engagement event with respect to a first one of the plurality of computer-generated objects based on at least a portion of the proxy object manipulation data and the finger manipulation data.

In accordance with some implementations, an electronic device includes one or more processors, a non-transitory memory, a display, an untethered input detection system, and a communication interface provided to communicate with a finger-wearable device, and optionally communicate with a physical proxy object including sensor(s). One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
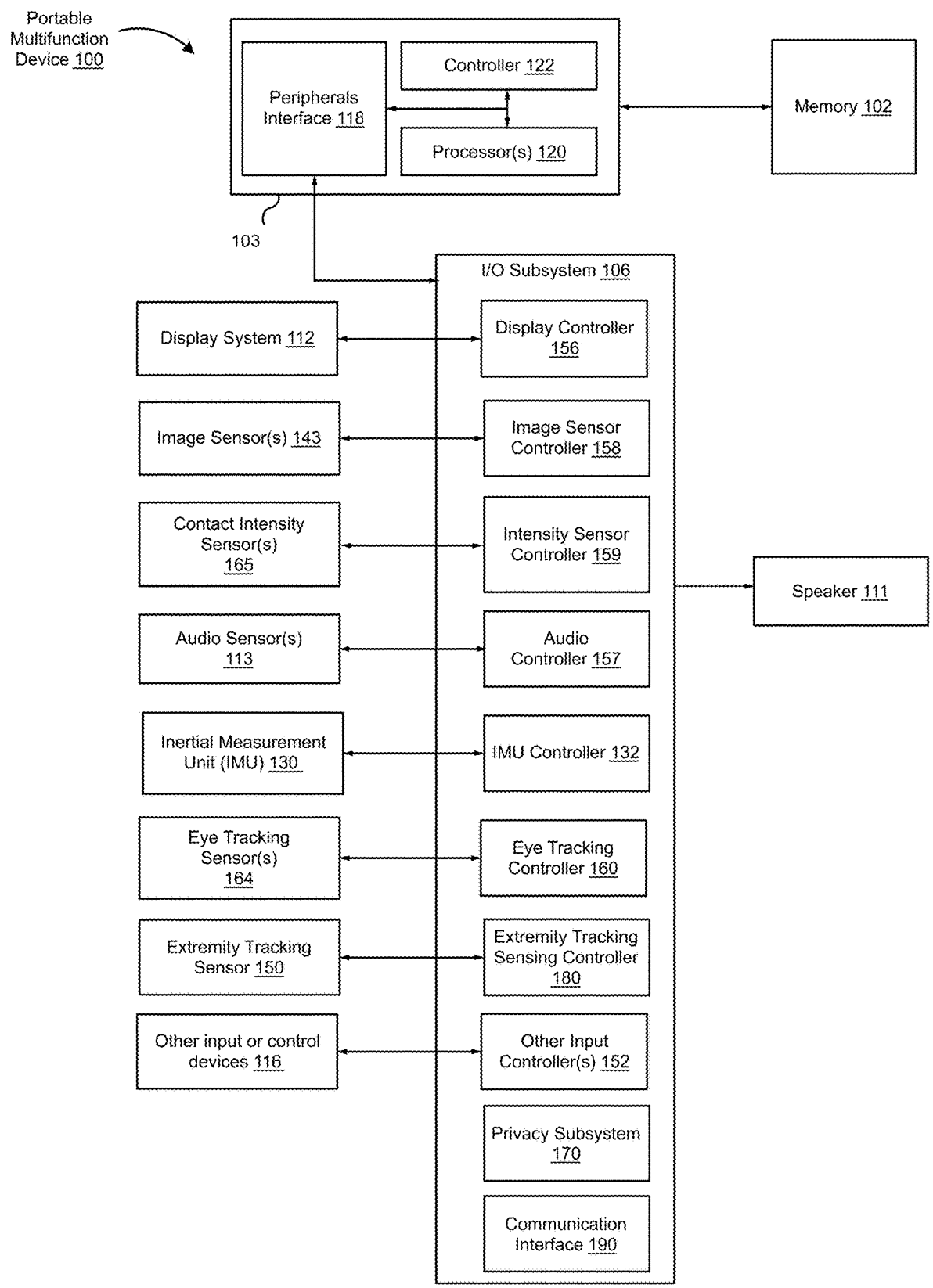
FIG. 1 is a block diagram of an example of a portable multifunction device in accordance with some implementations.

An electronic device, including an integrated input system, may manipulate the display of a computer-generated object based on an input from the integrated input system. For example, the integrated input system corresponds to one of an extremity tracking input system or an eye tracking input system. As one example, the electronic device utilizes an extremity tracking input from the extremity tracking input system in order to identify that an extremity of a user satisfies a proximity threshold with respect to a particular computer-generated object. Accordingly, the electronic device manipulates the particular computer-generated object based on the extremity tracking input. Utilizing an input from an integrated input system in order to manipulate a computer-generated object introduces a number of issues. For example, when a physical object occludes (e.g., blocks) a portion of an extremity, the reliability of the extremity tracking input is correspondingly reduced. As another example, the limited mobility of a user's eyes and the unsteadiness of the user's extremity reduces the efficiency associated with manipulating a computer-generated object. As yet another example, a computer-generated object that has a relatively high depth with respect to the display, such as a computer-generated object located in a scene background, may be difficult for a user to manipulate via extremity tracking, thereby introducing extremity tracking inaccuracies.

By contrast, various implementations disclosed herein include methods, electronic devices, and systems for registering engagement events with computer-generated objects based on a combination of finger manipulation data from a finger-wearable device and untethered inputs. Accordingly, various implementations disclosed herein provide reliable and robust user engagement with computer-generated objects. The electronic device receives the finger manipulation data from a finger-wearable device via a communication interface. The finger-wearable device can be worn by a finger of a user. In some implementations, the electronic device tracks the finger with six degrees of freedom (6DOF) based on the finger manipulation data. Thus, even when a physical object occludes a portion of the finger-wearable device, the electronic device continues to receive finger manipulation data from the finger-wearable device. Additionally, the electronic device enables object engagement (e.g., disambiguation, manipulation, etc.) based on the finger manipulation data, independent of an apparent distance between the finger-wearable device and the computer-generated object. Accordingly, using a combination of the finger manipulation data and untethered inputs enables a user to have more control and accuracy when engaging with computer-generated objects, as compared with other devices.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, a privacy subsystem 170, and a communication interface 190. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, finger-wearable device, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time of flight sensor that obtains depth information characterizing a particular object.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a finger-wearable device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2:
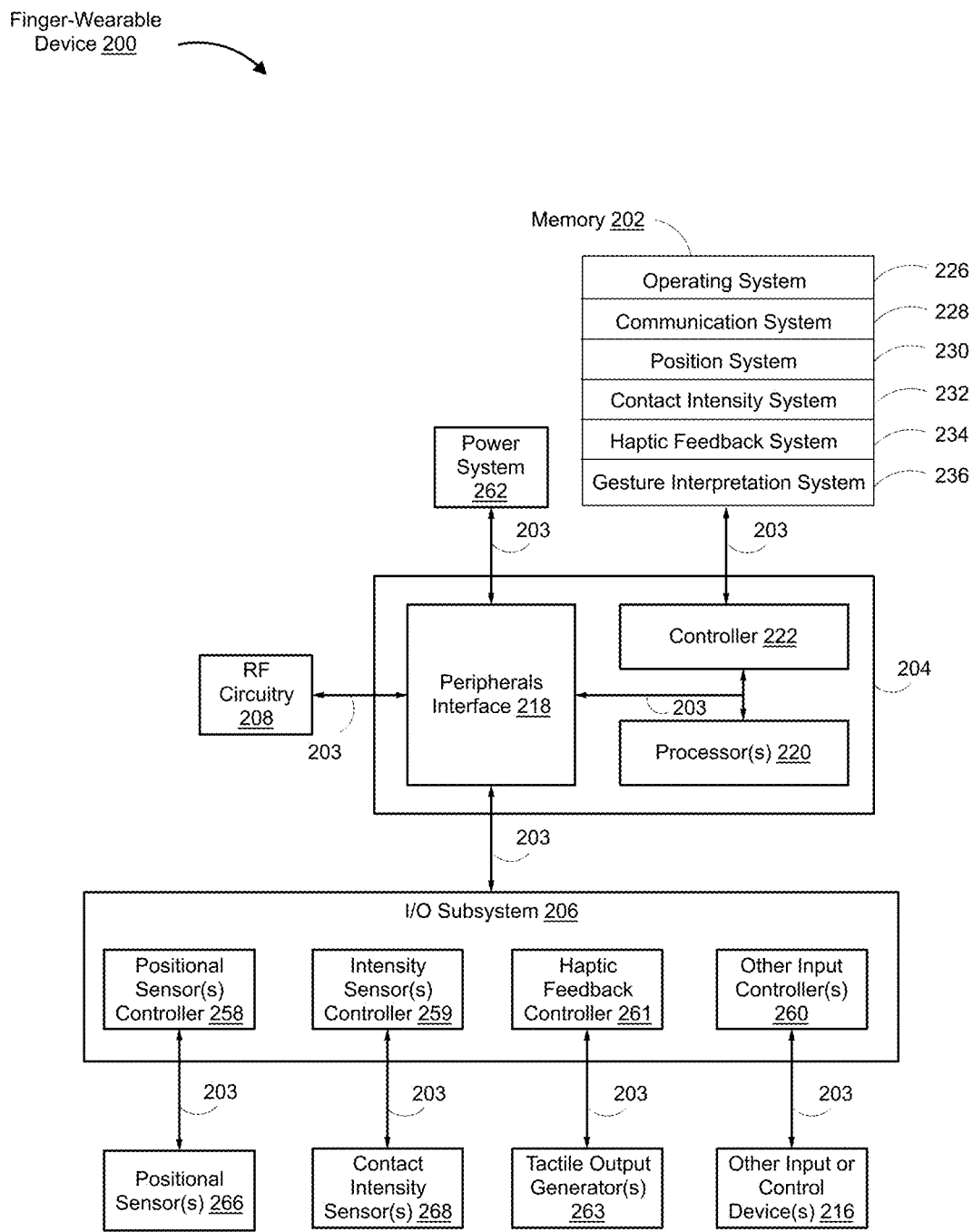
FIG. 2 is a block diagram of an example of a finger-wearable device in accordance with some implementations.
Figure 3A:
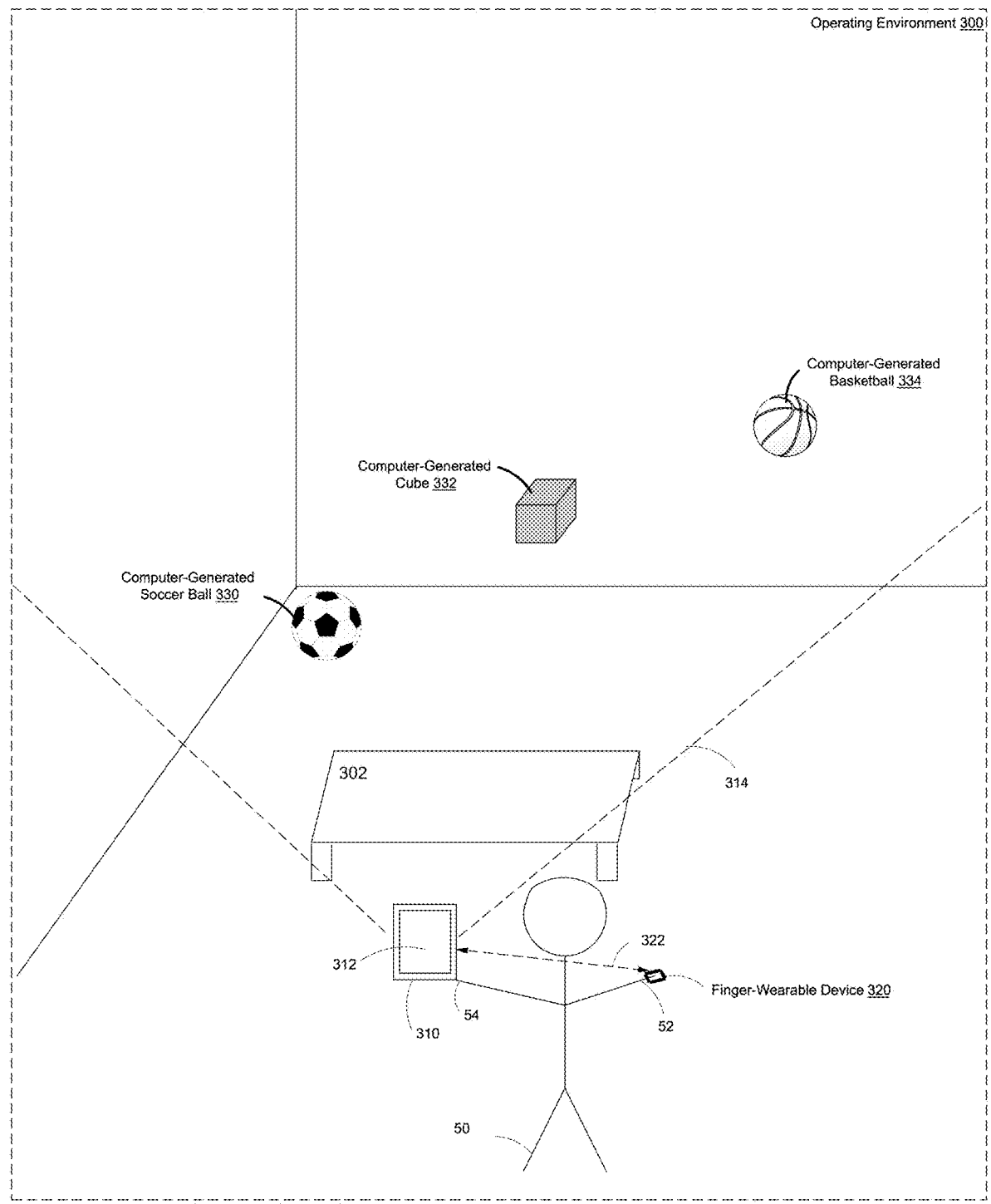
FIGS. 3A-3V are examples of an electronic device registering various engagement events based on finger manipulation data and untethered inputs in accordance with some implementations.
Figure 3B:
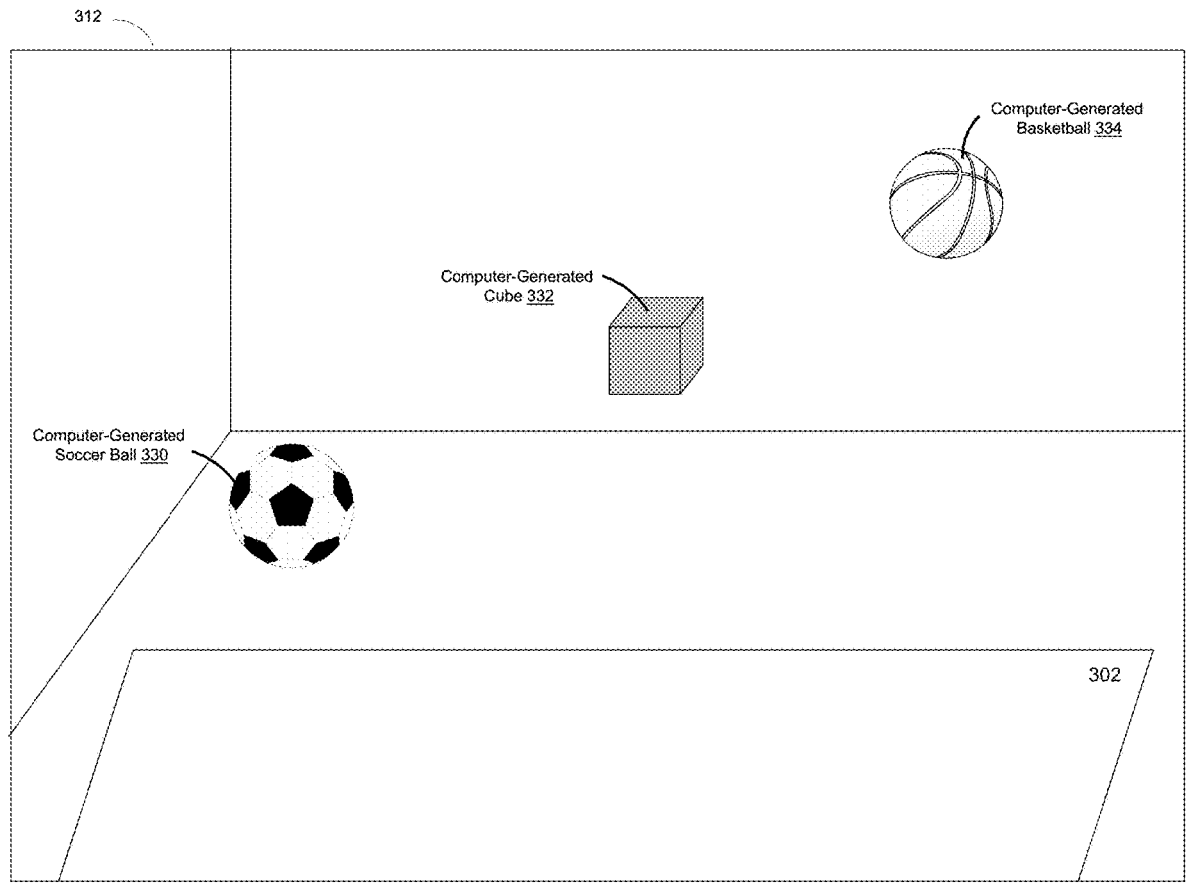
Figure 3C:
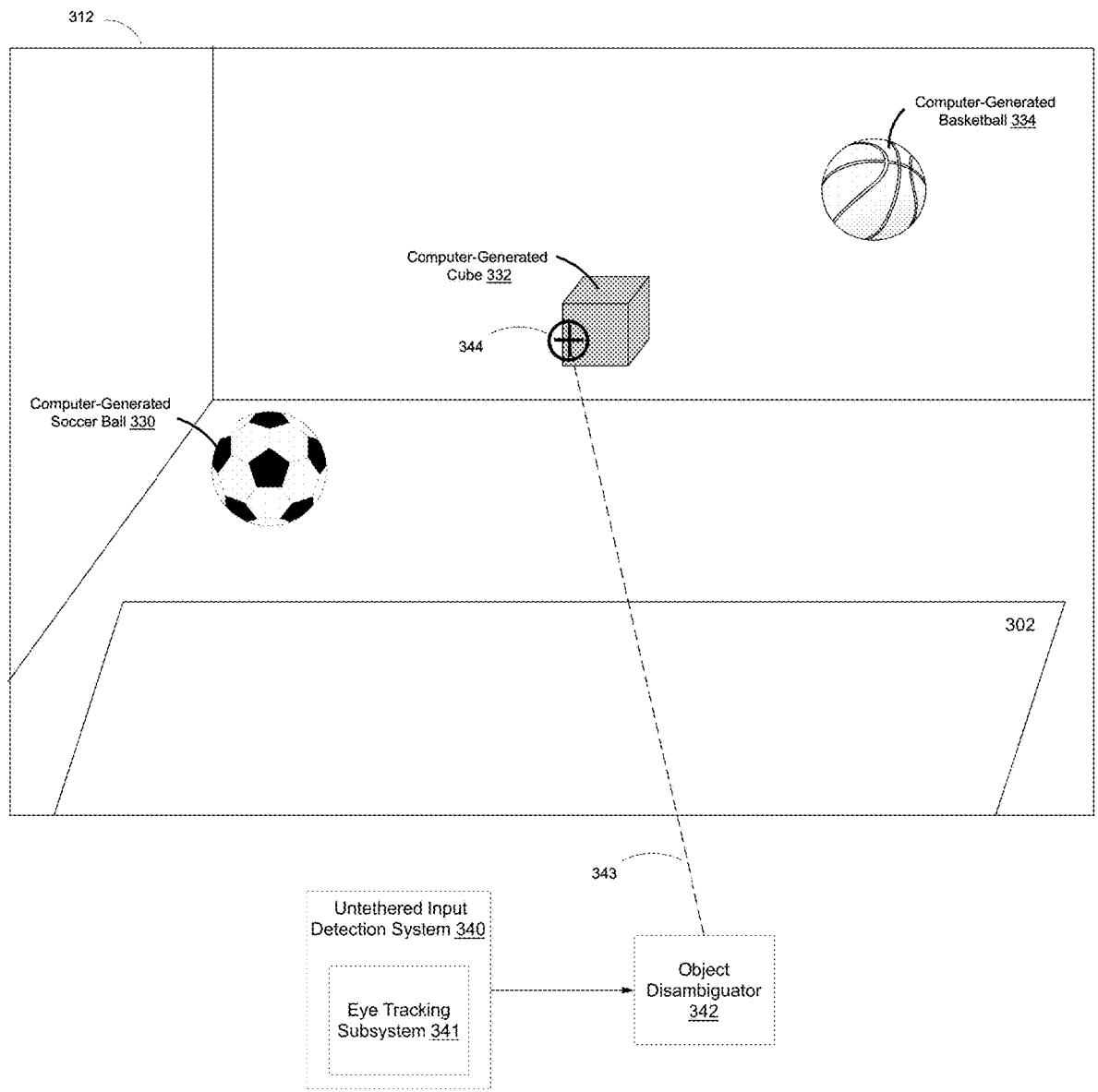
Figure 3D:
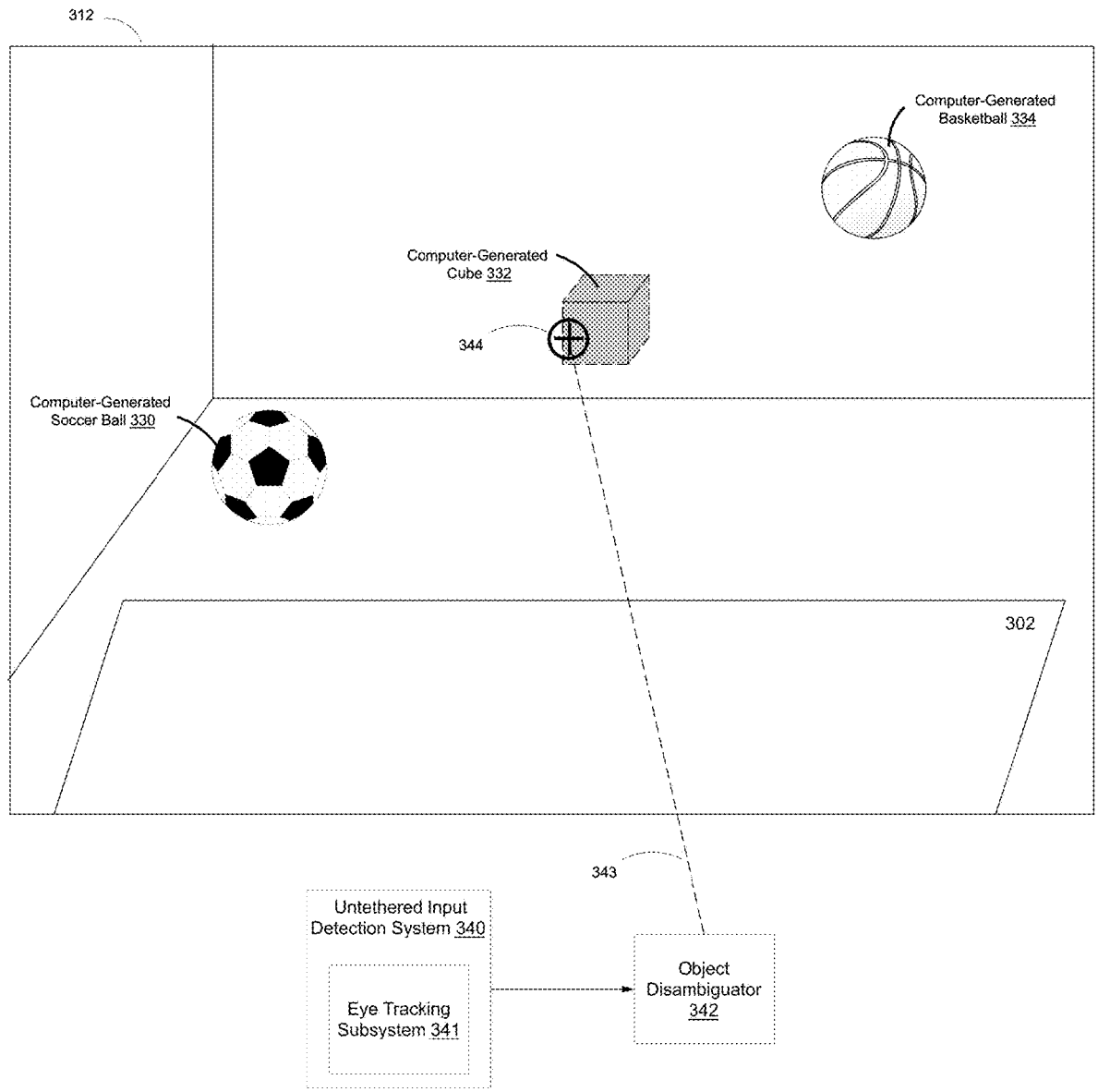
Figure 3E:
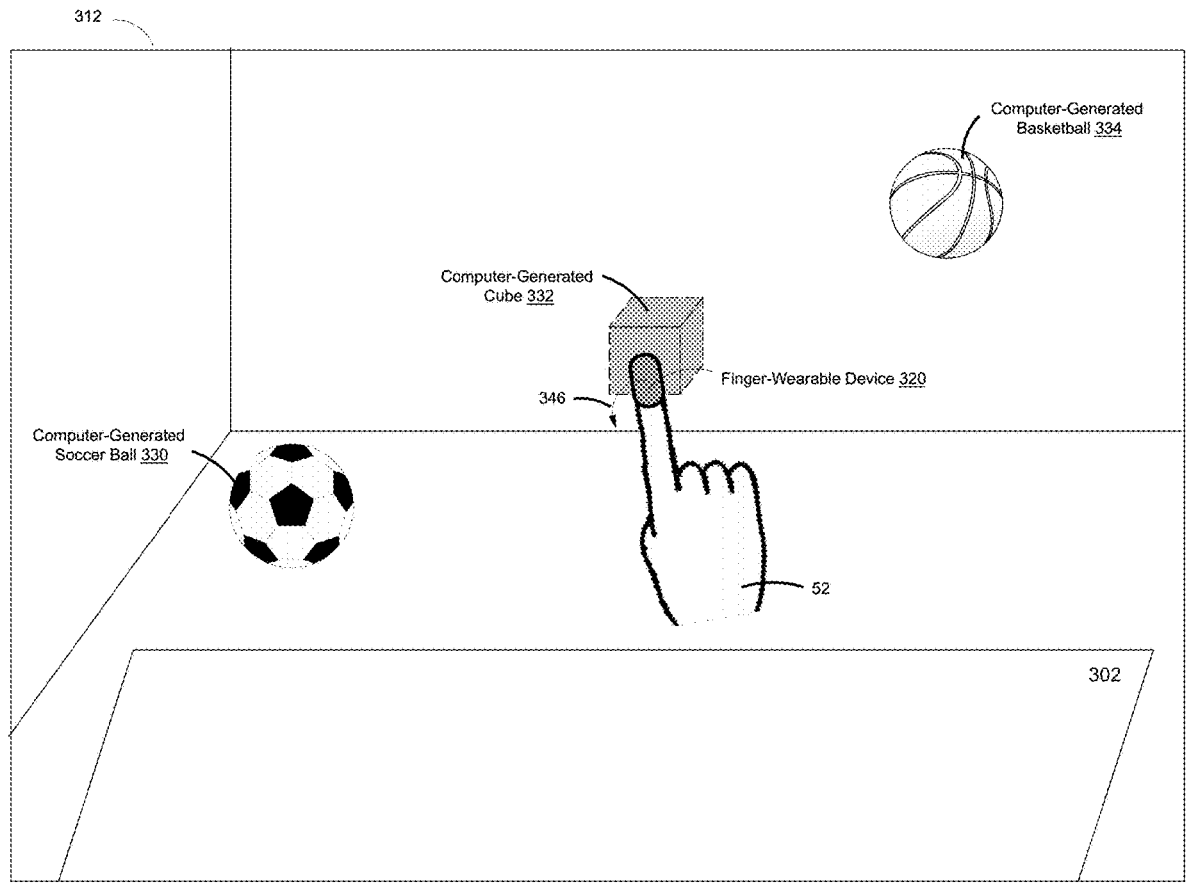
Figure 3F:
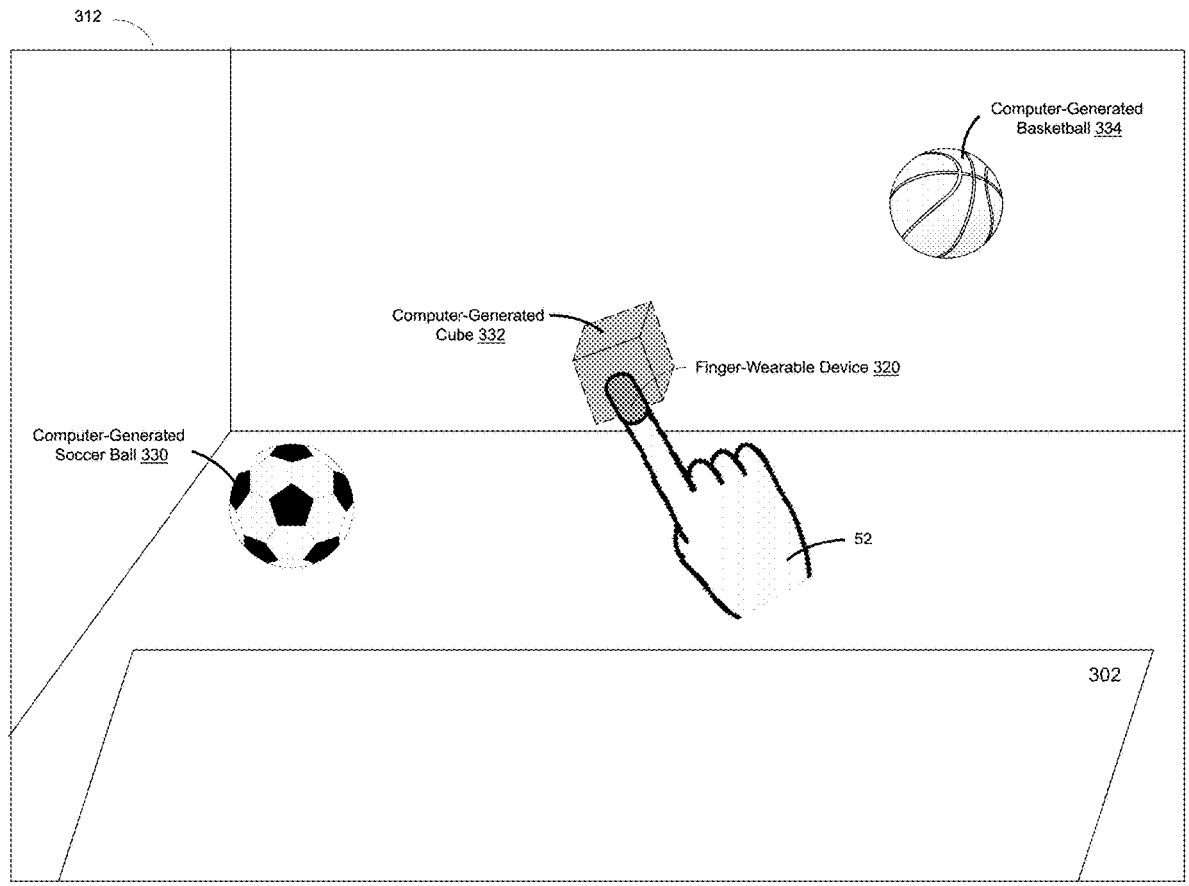
Figure 3G:
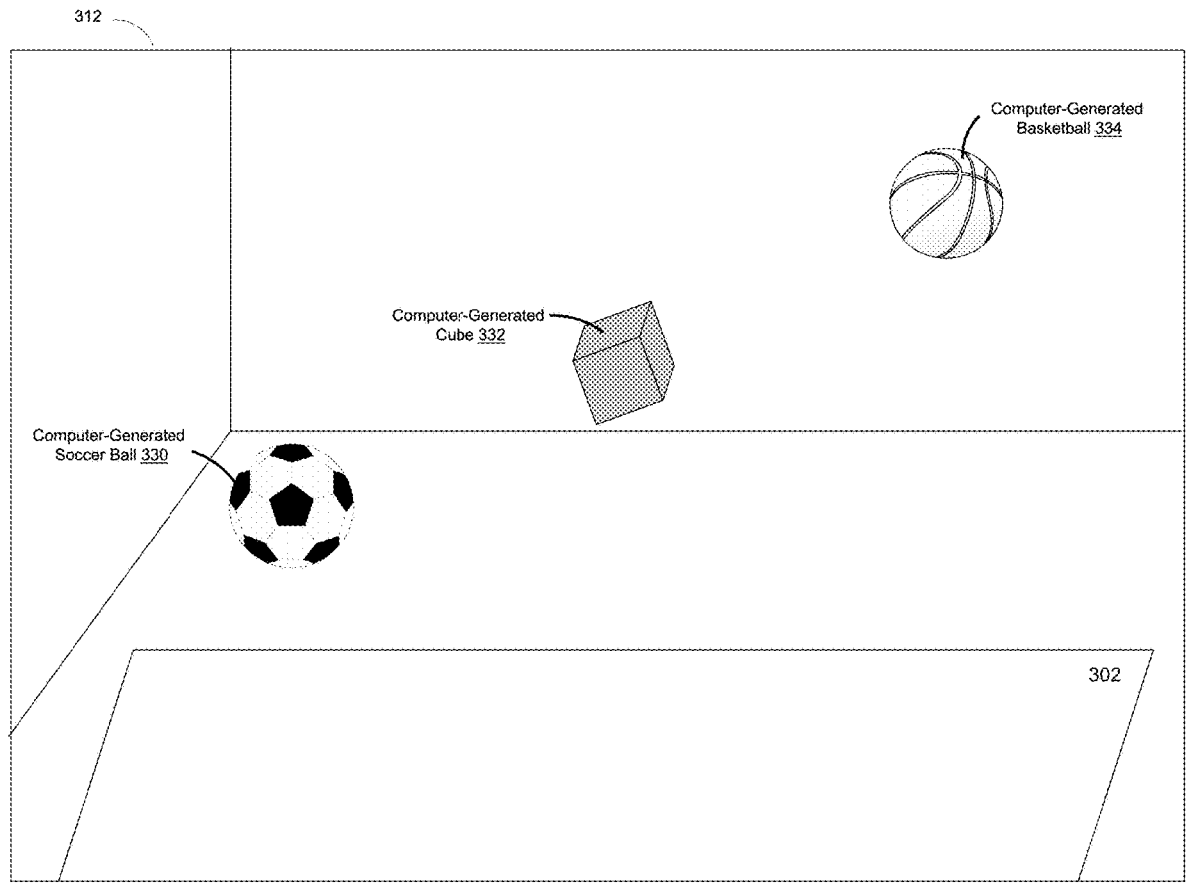
Figure 3H:
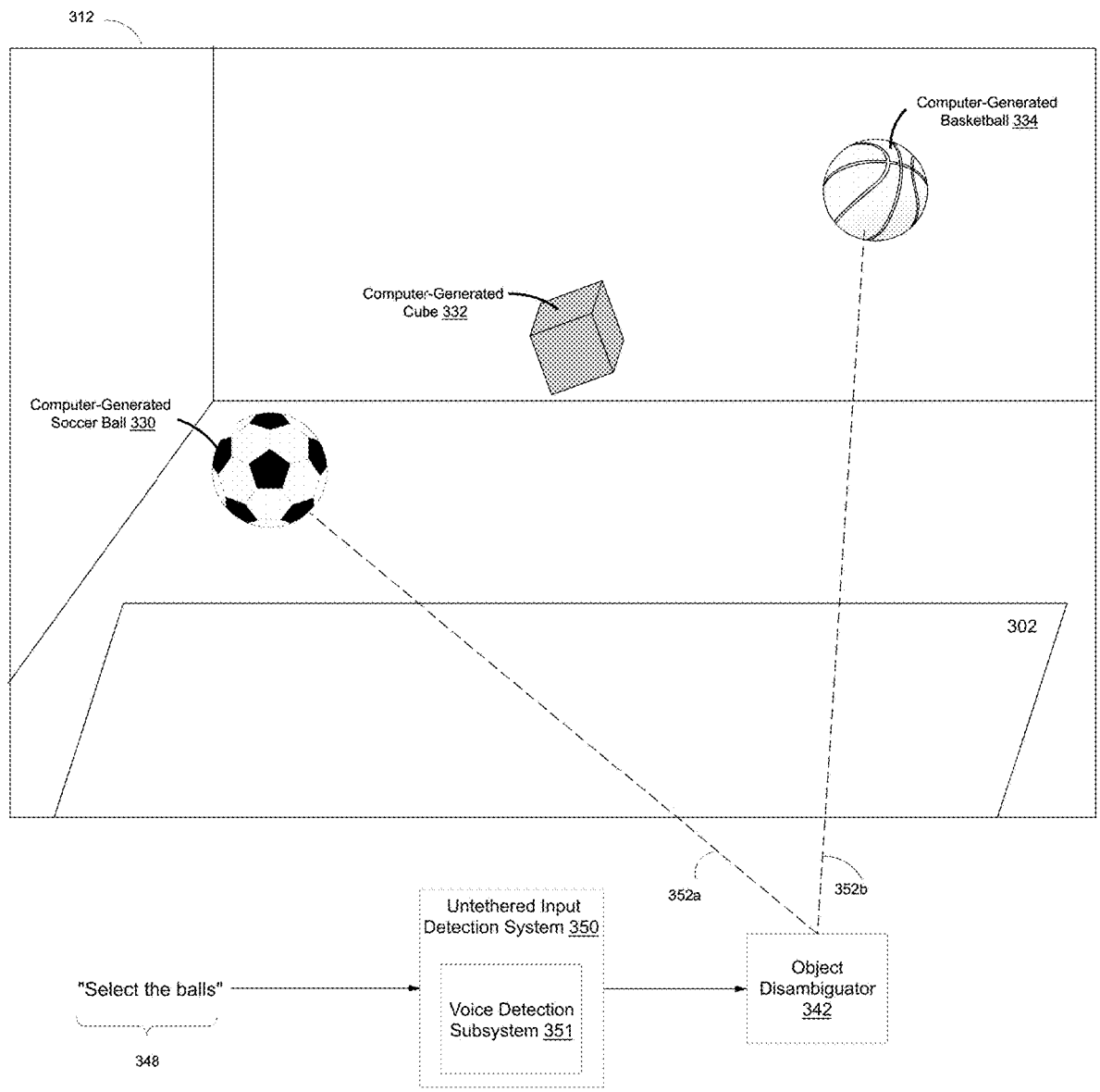
Figure 3I:
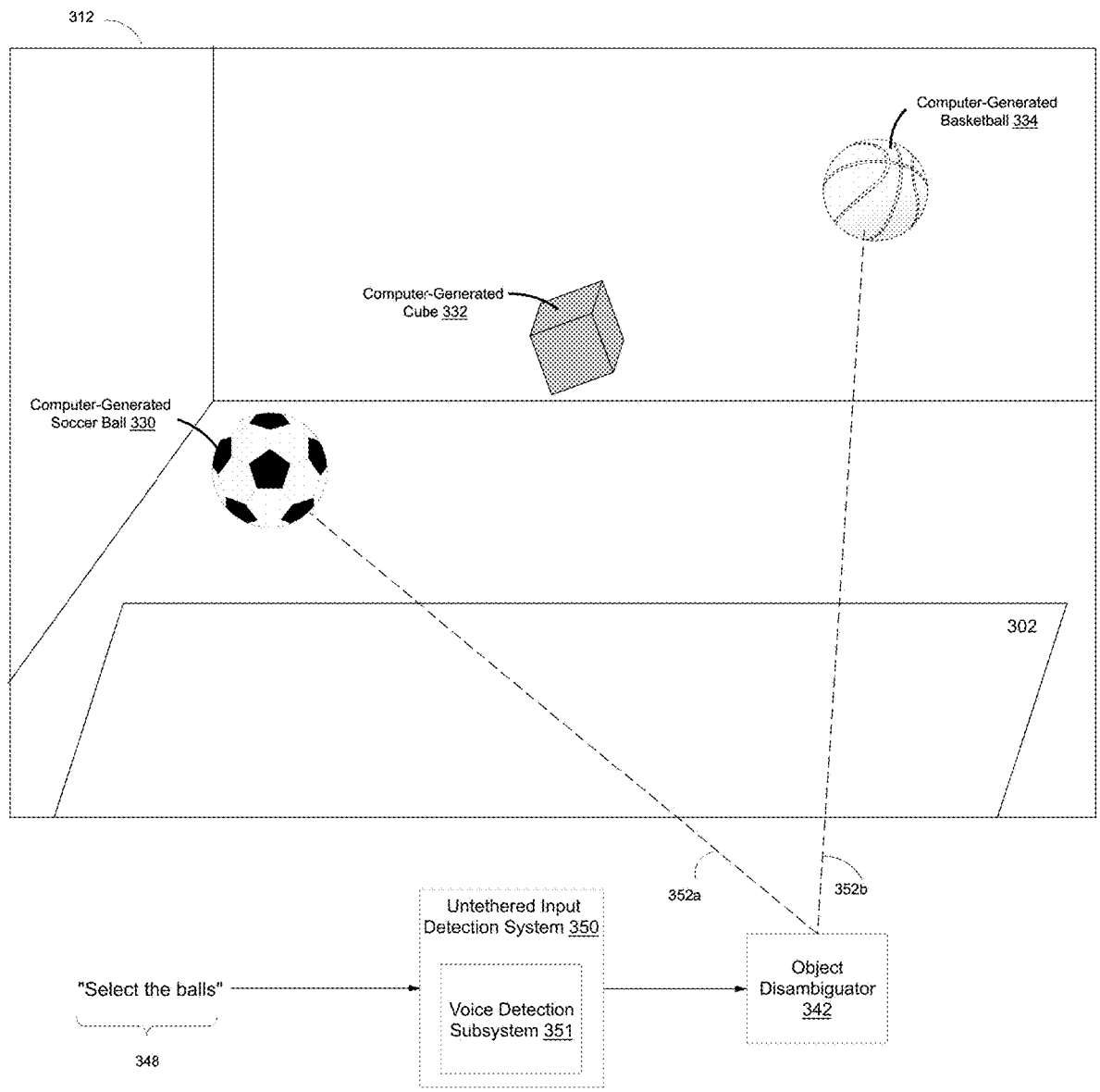
Figure 3J:
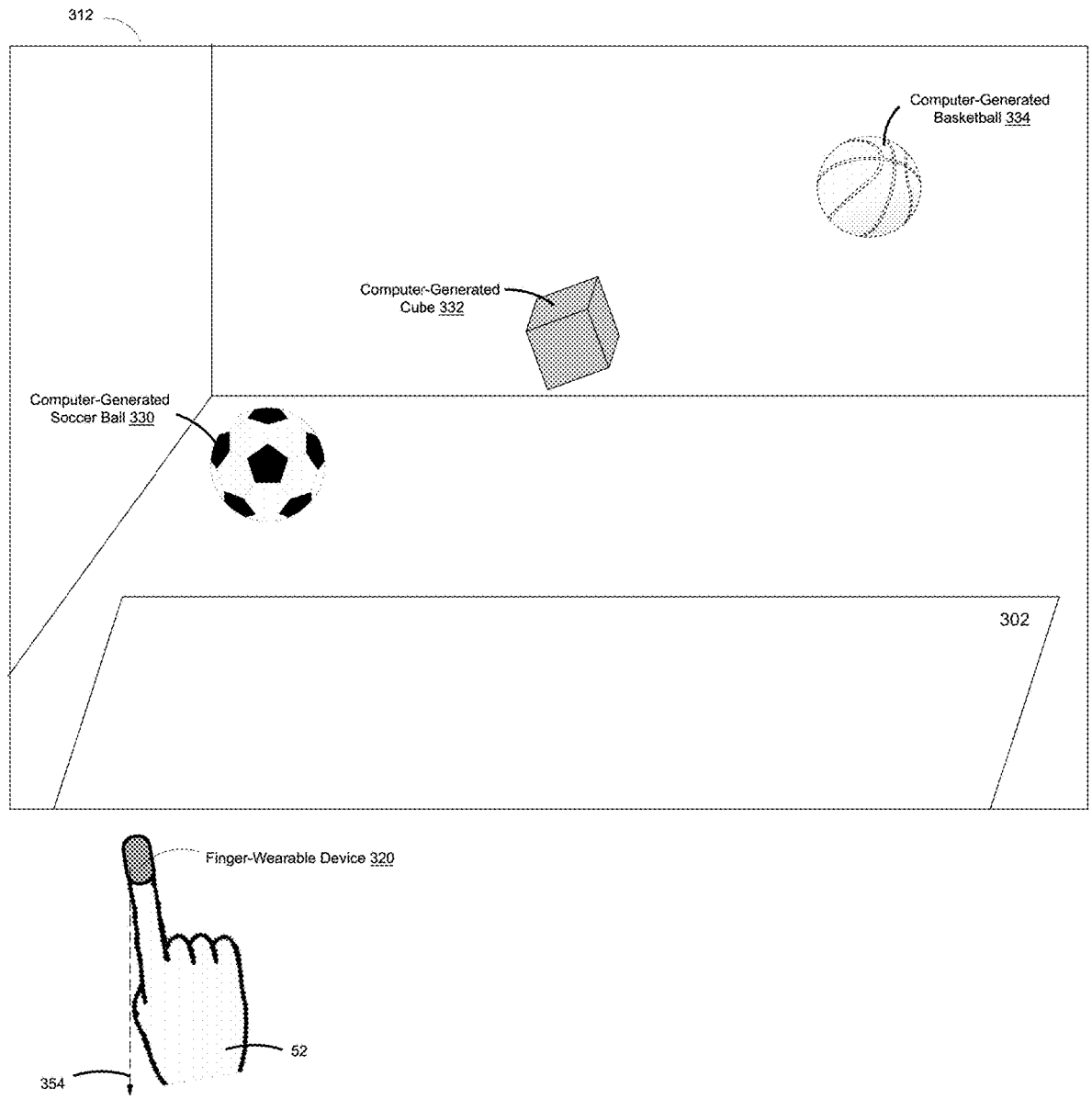
Figure 3K:
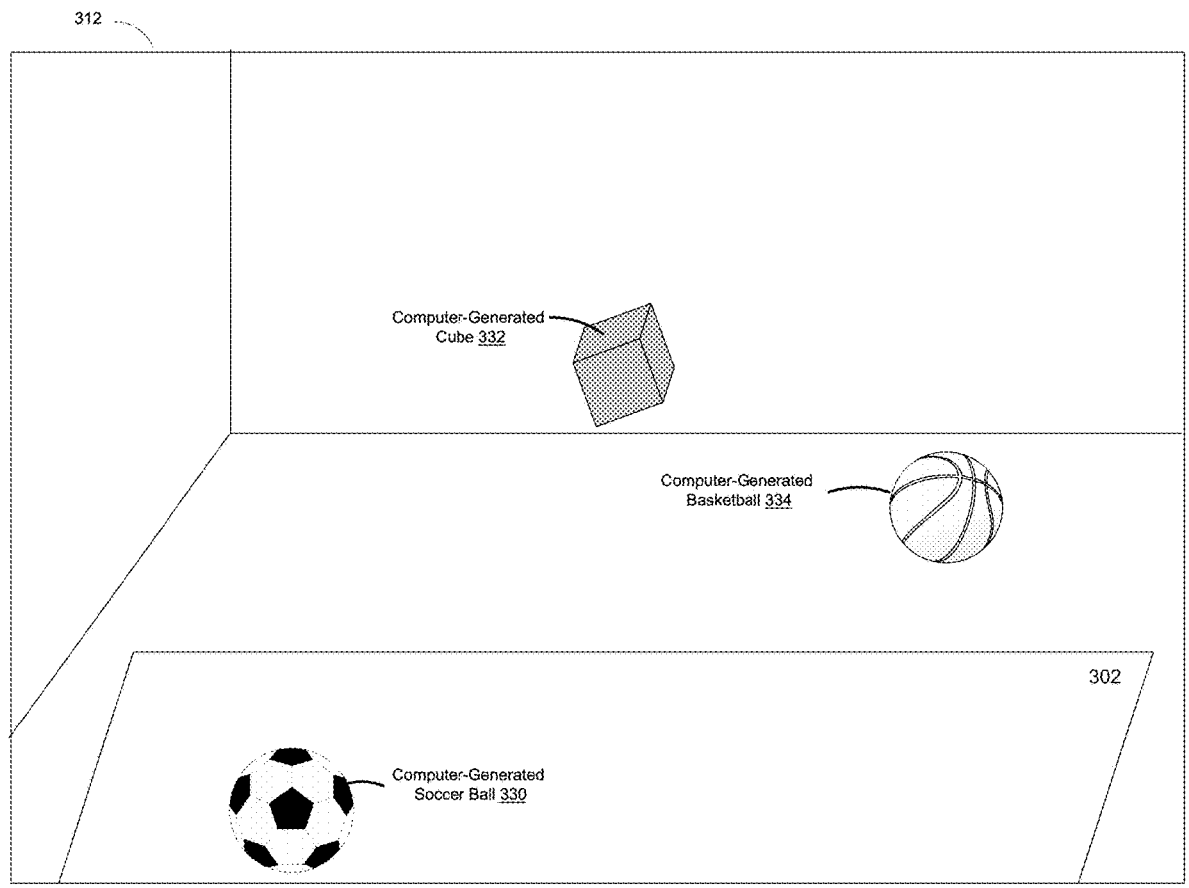
Figure 3K:
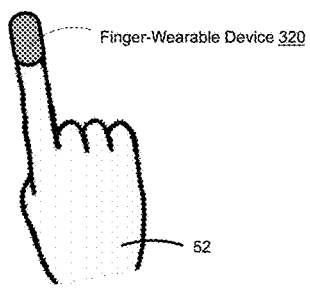
Figure 3L:
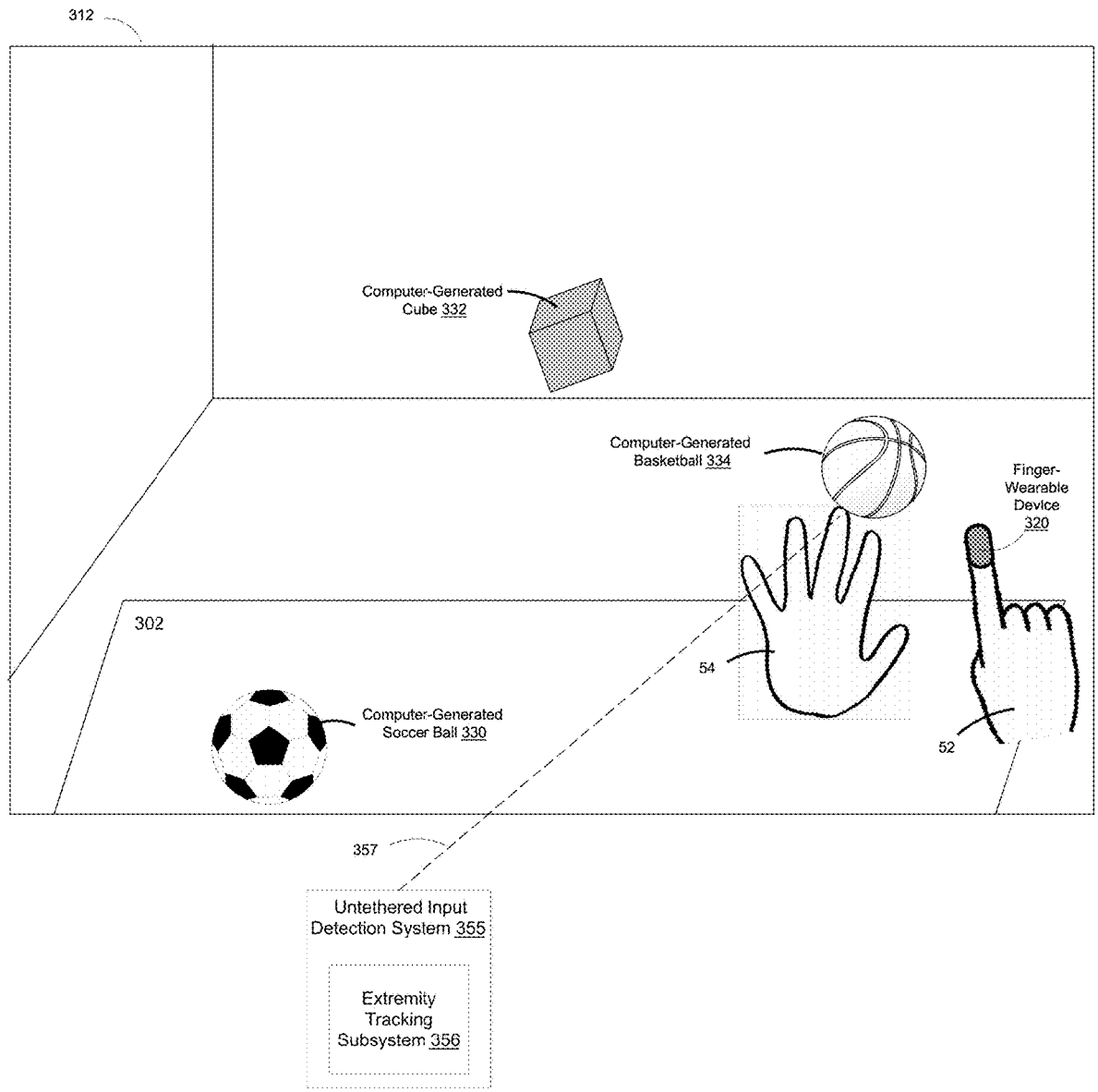
Figure 3M:
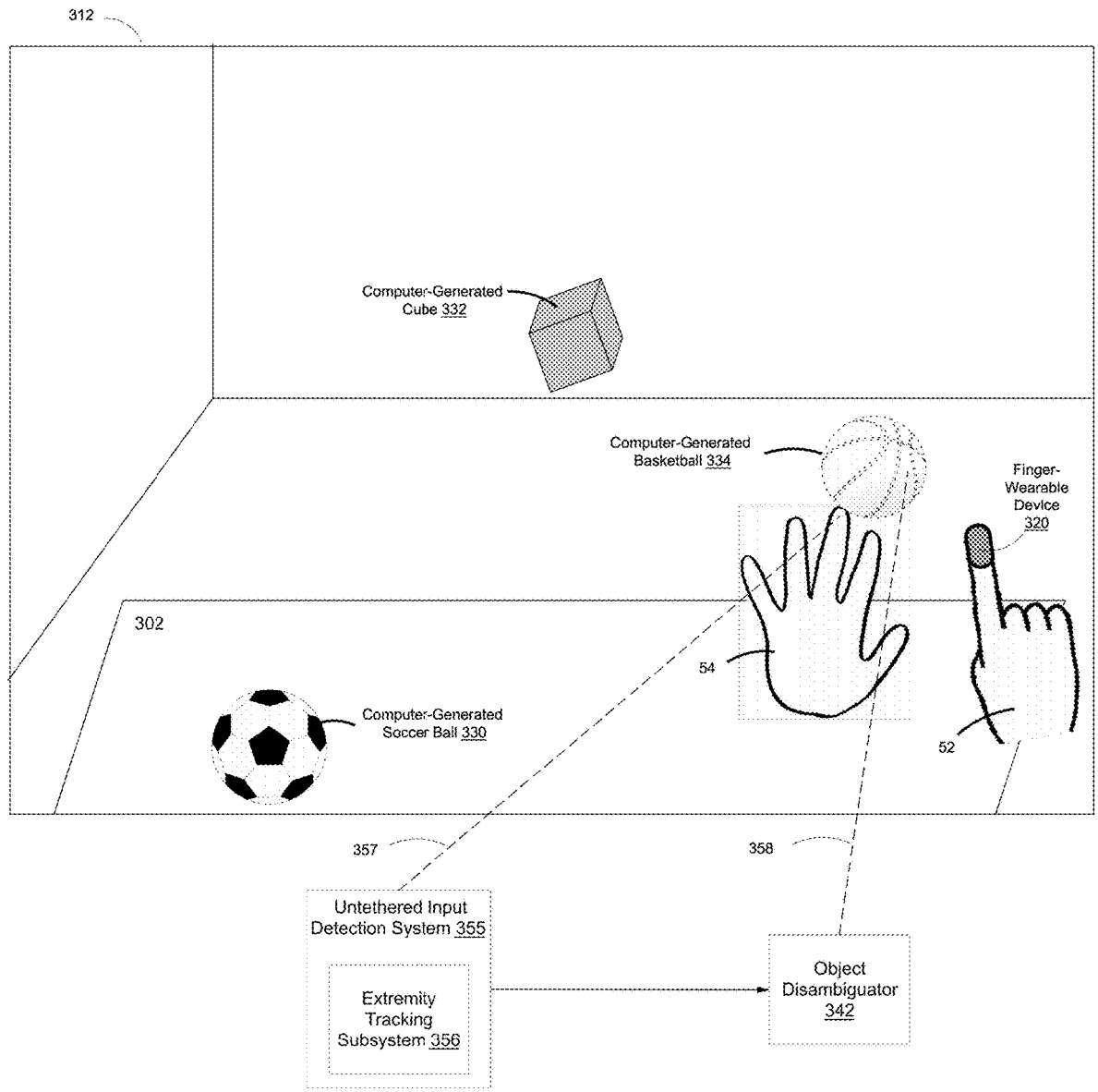
Figure 3N:
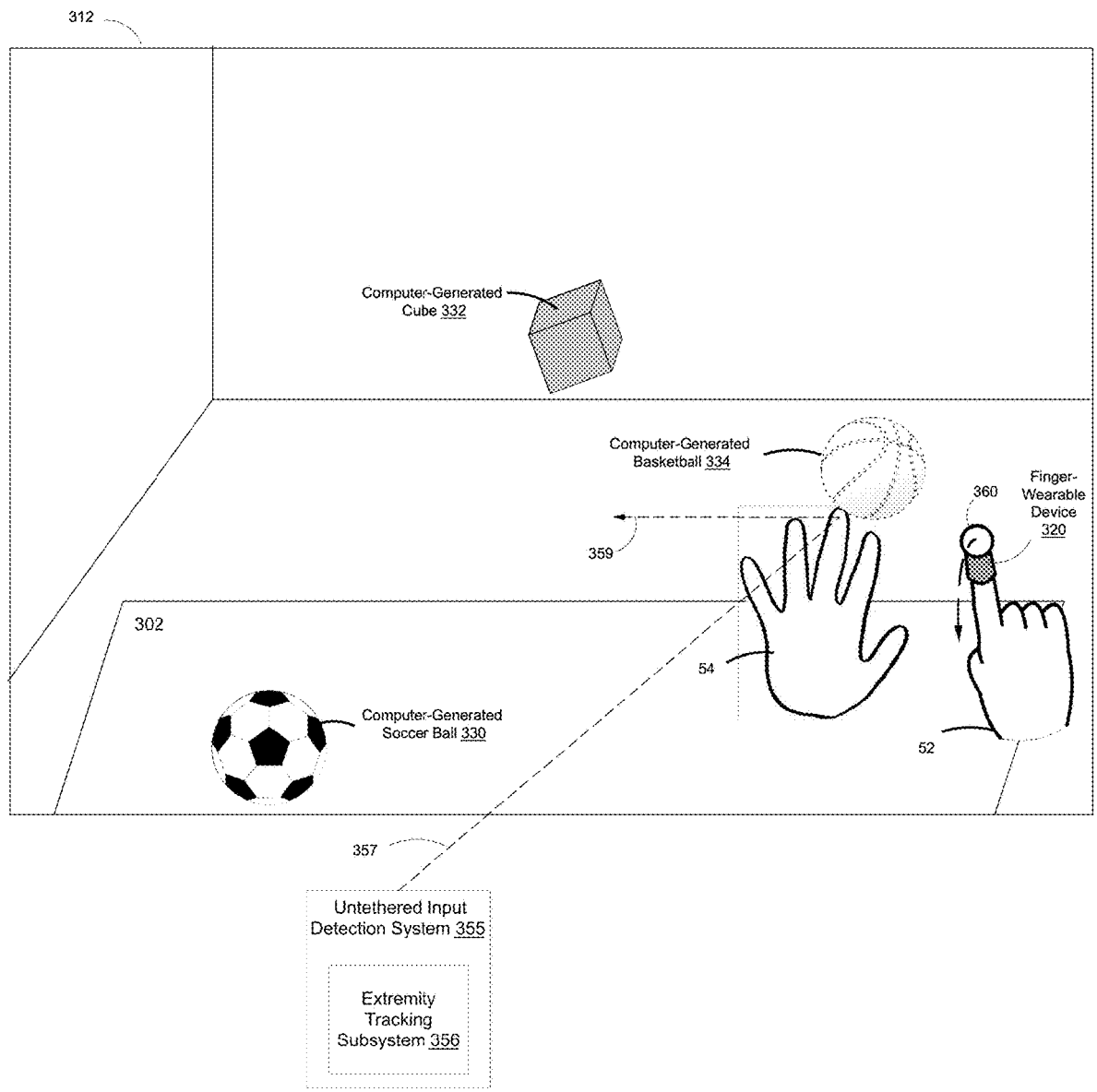
Figure 3O:
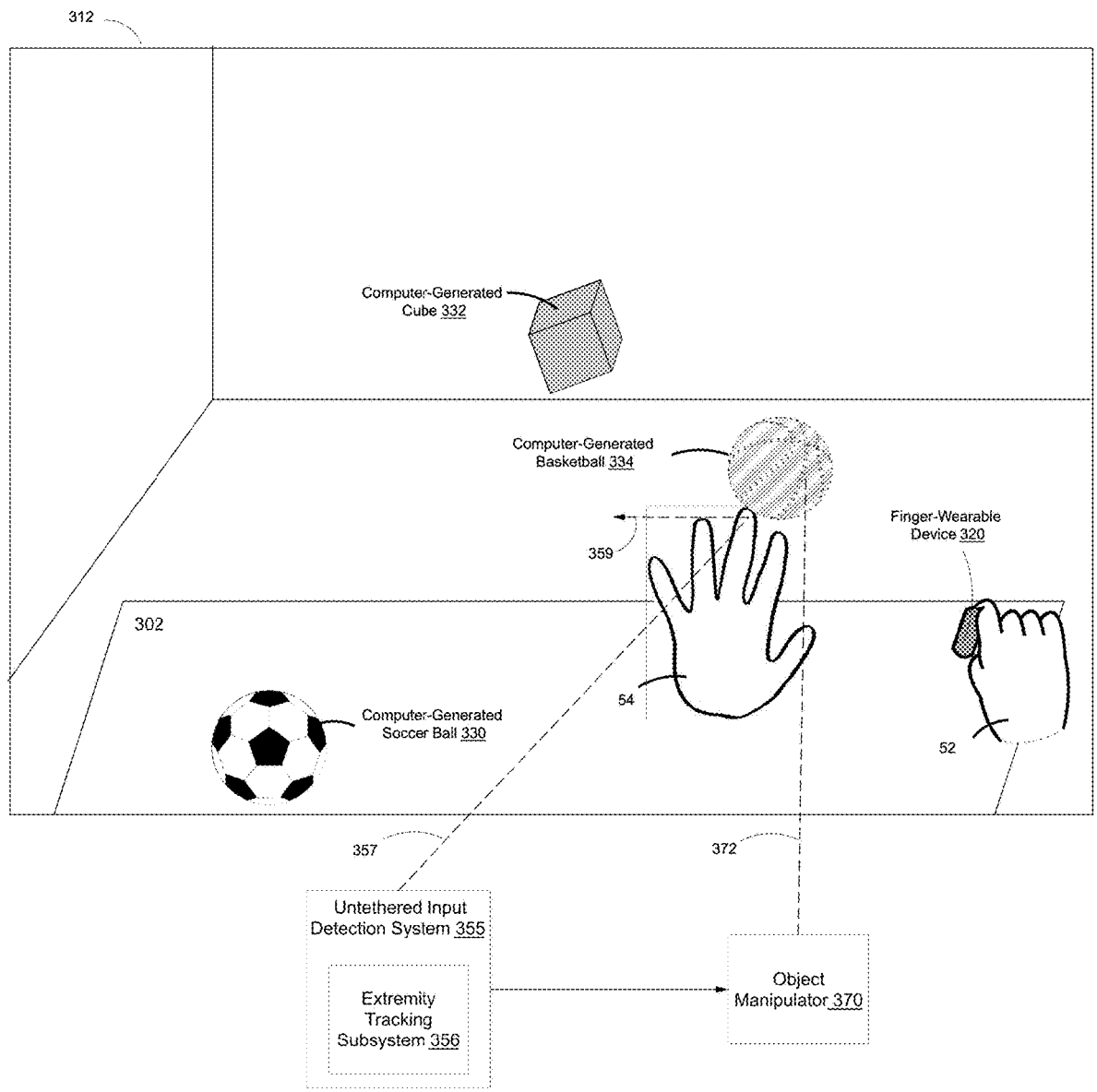
Figure 3P:
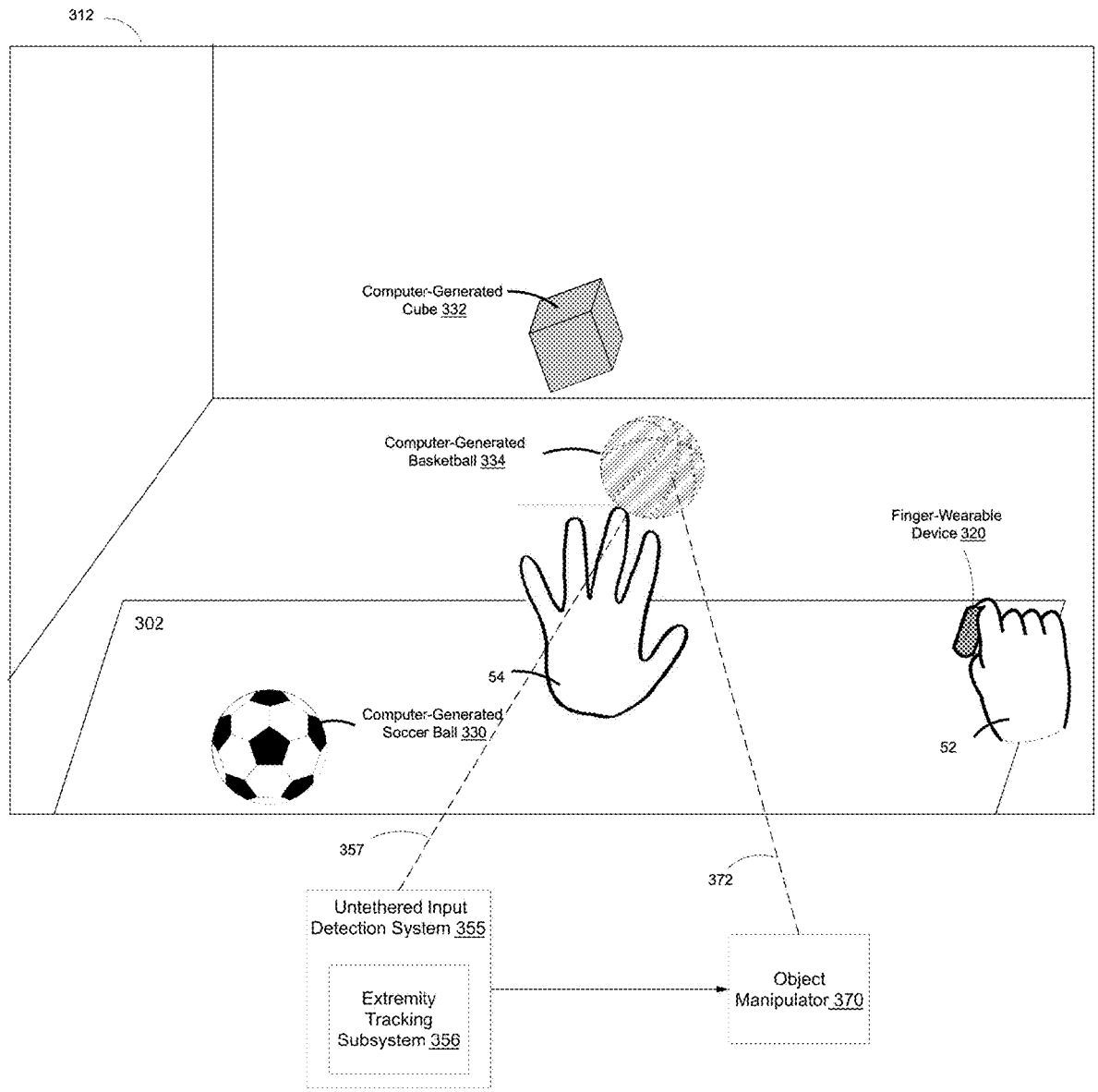
Figure 3Q:
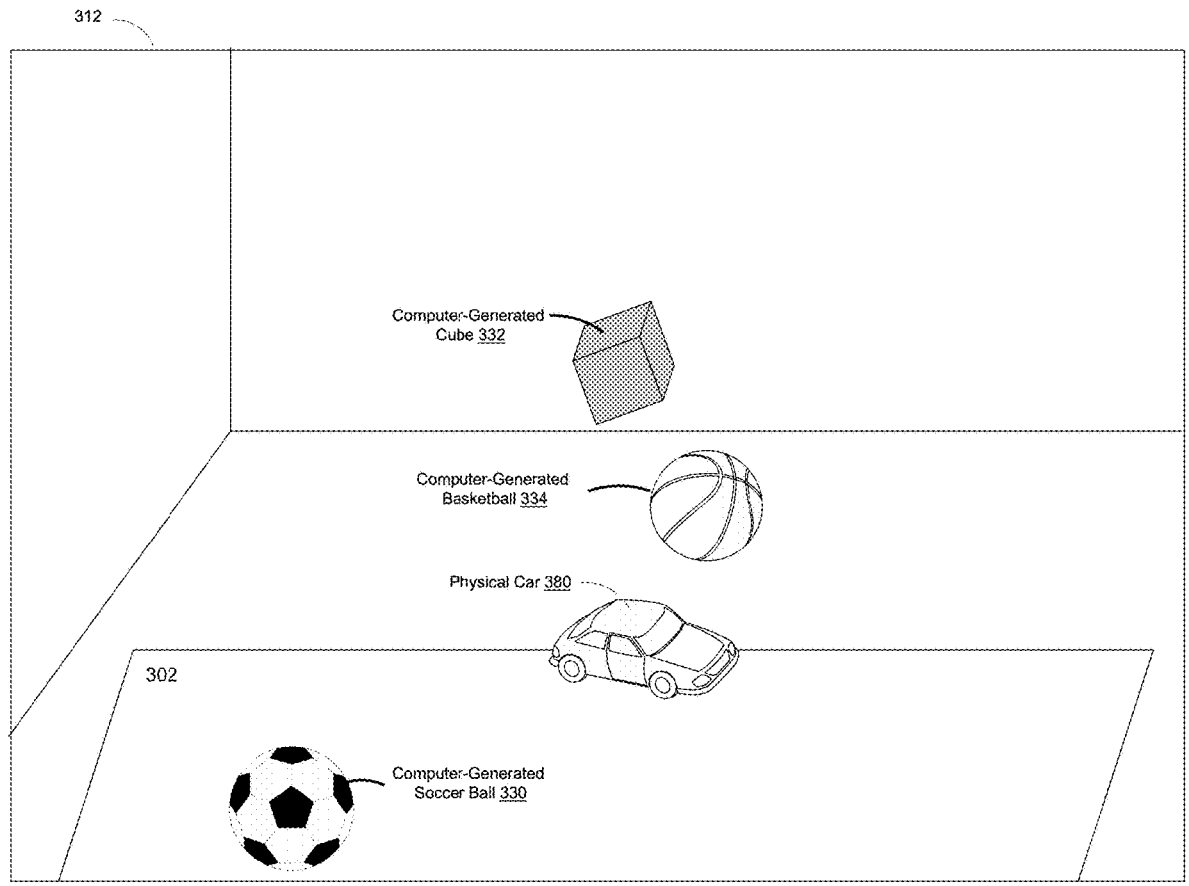
Figure 3R:
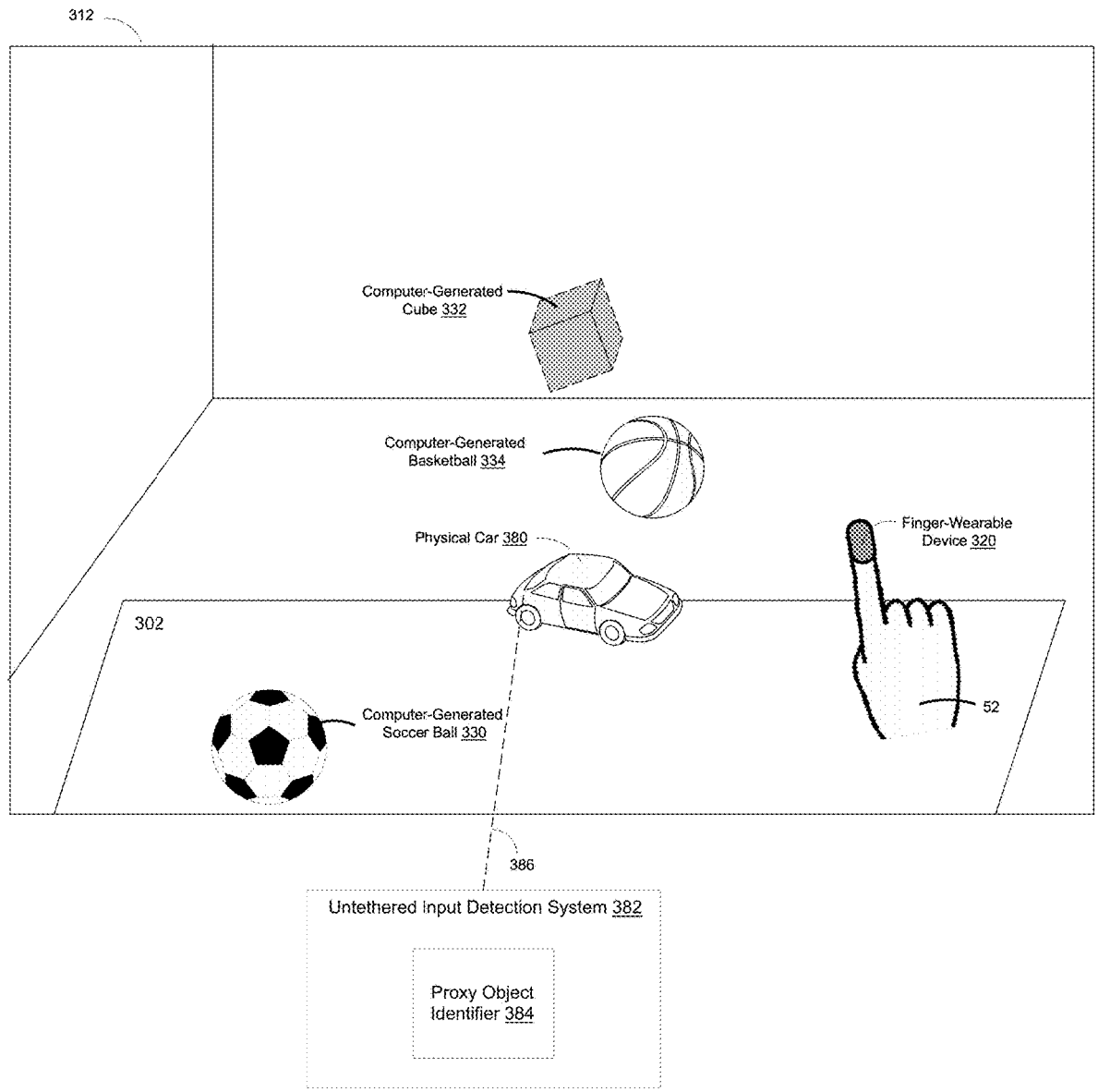
Figure 3S:
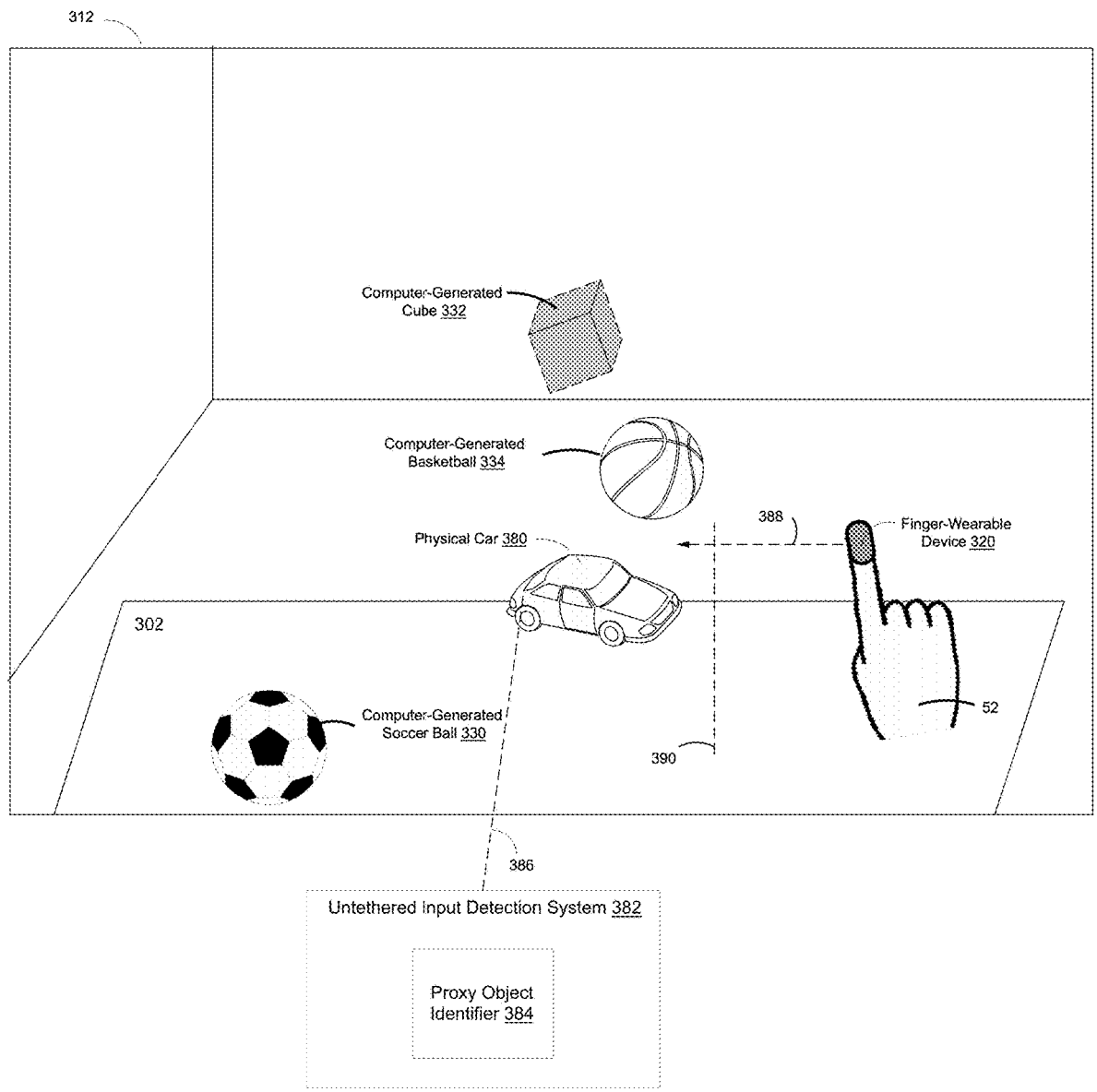
Figure 3T:
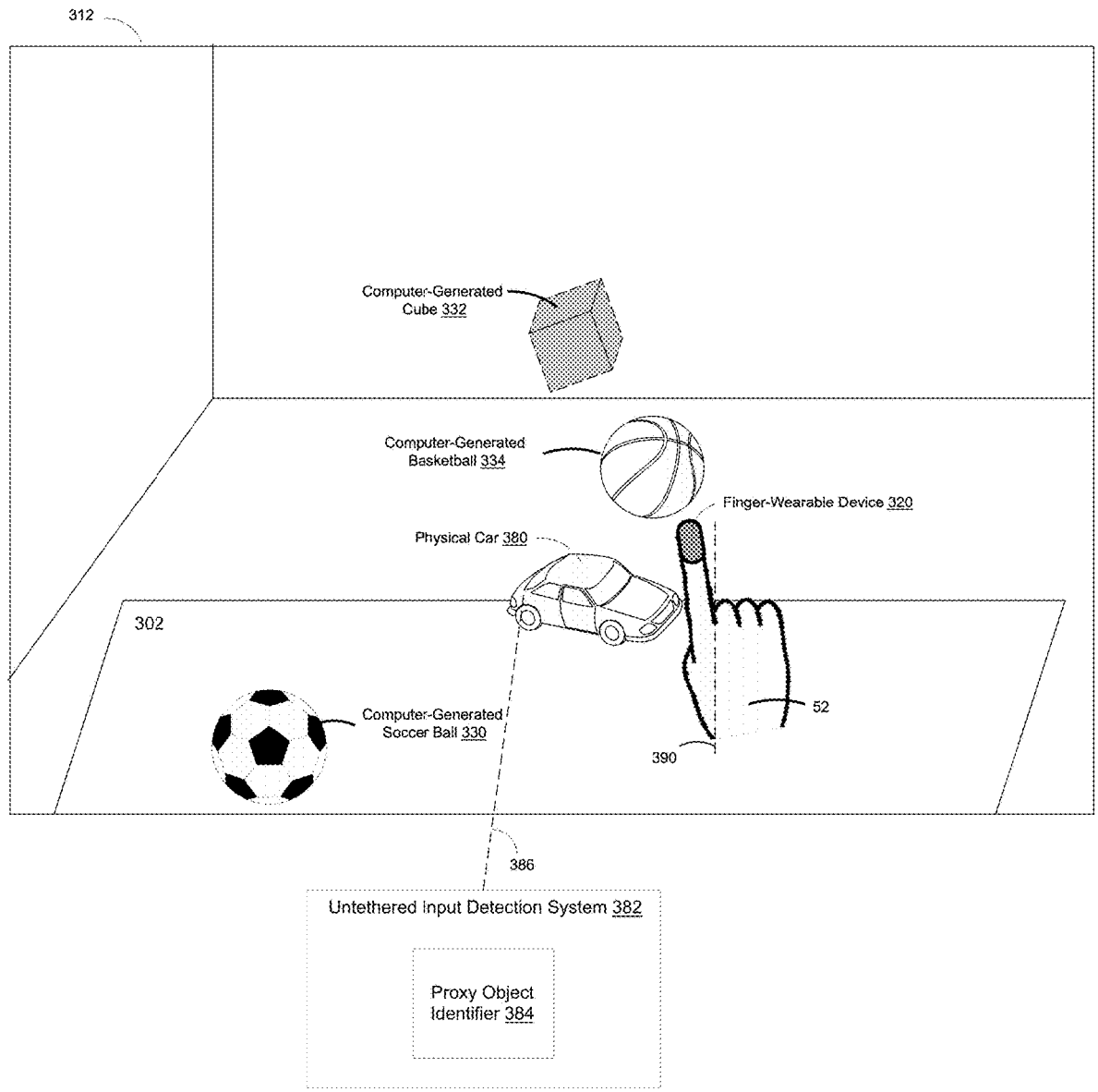
Figure 3U:
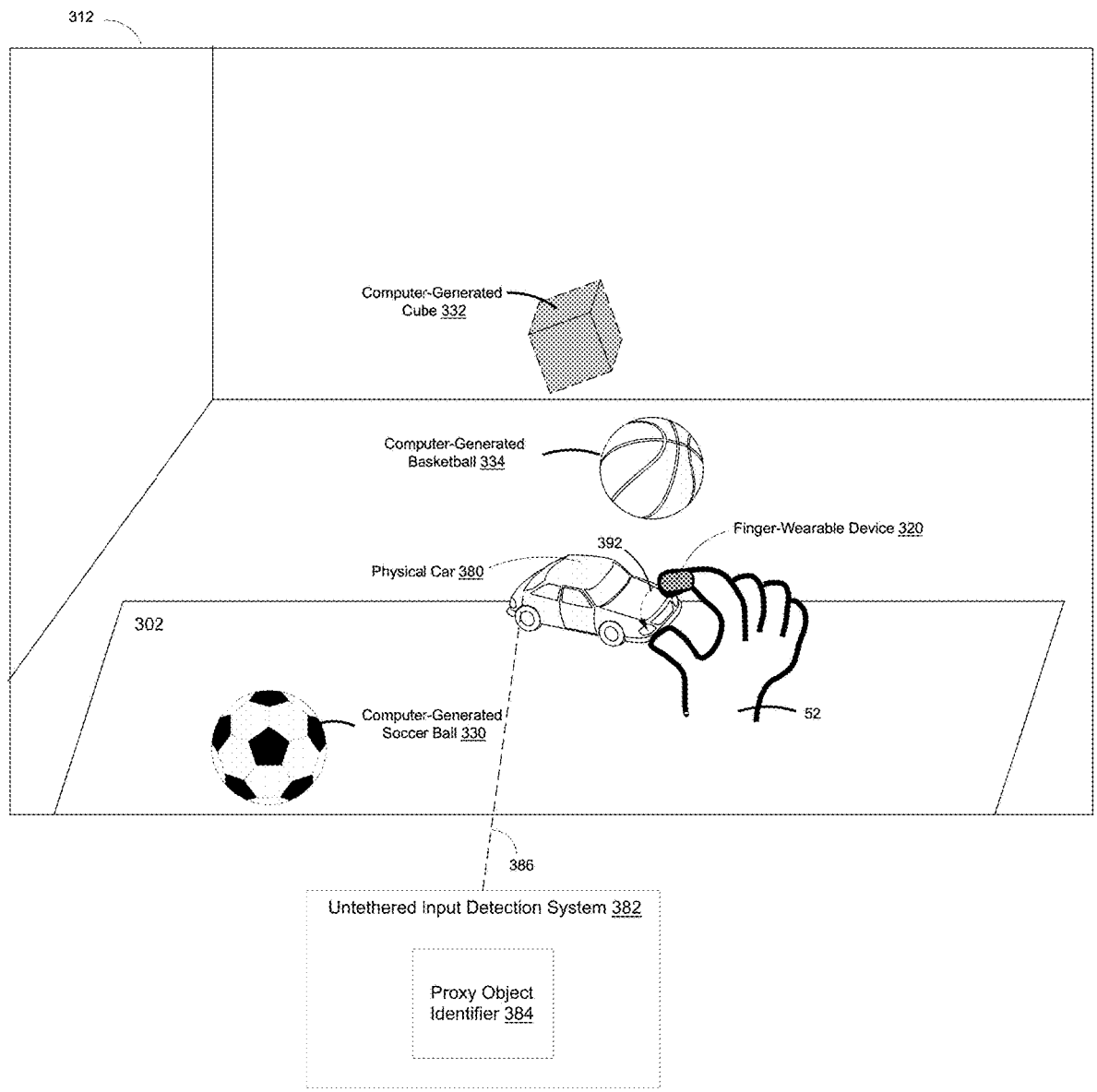
Figure 3V:
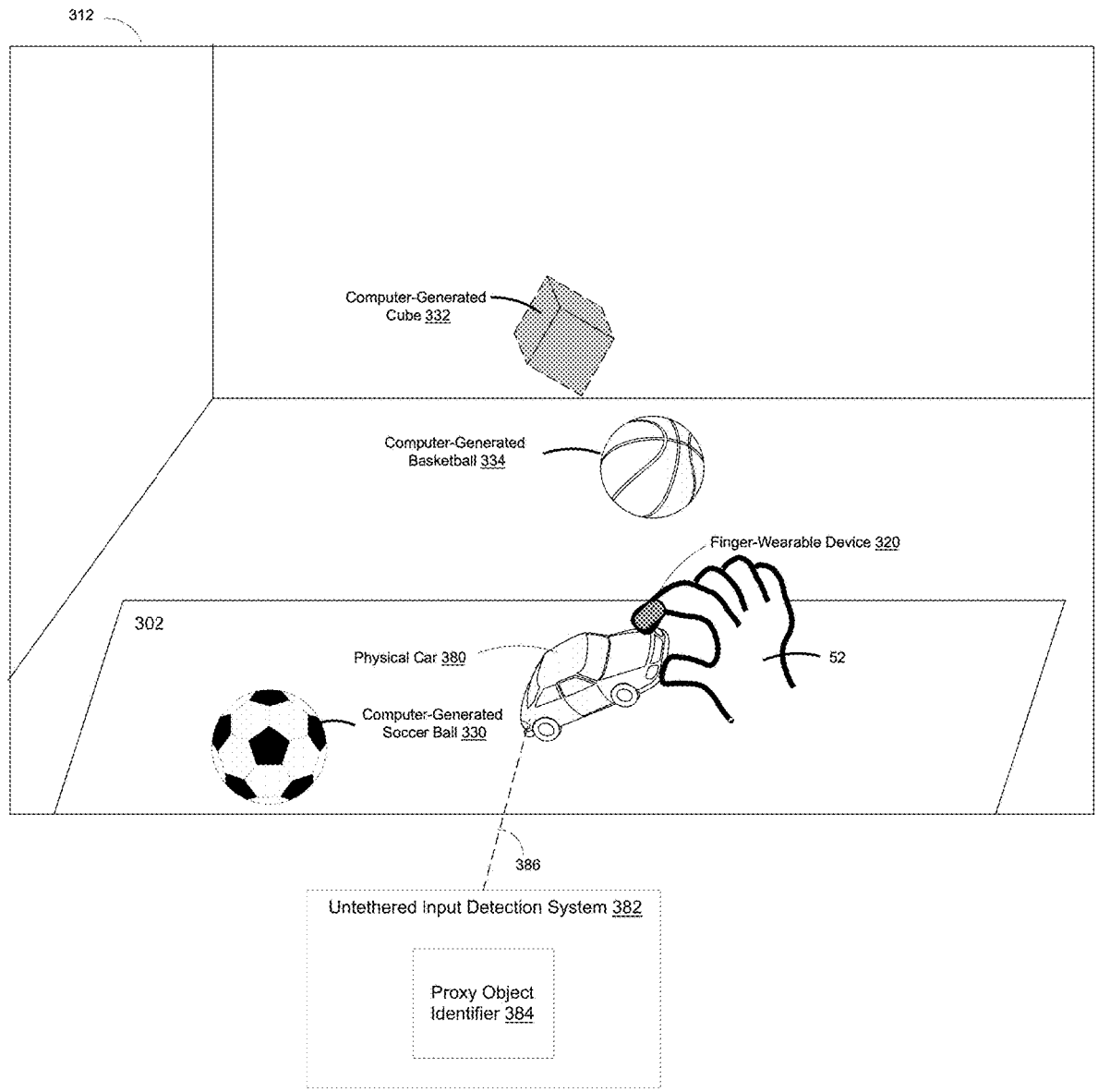

The electronic device 100 includes a communication interface 190 that is provided to communicate with a finger-wearable device, such as the finger-wearable device 200 illustrated in FIG. 2 or the finger-wearable device 320 in FIGS. 3A-3V. For example, the communication interface 190 corresponds to one of a BLUETOOTH interface, IEEE 802.11x interface, near field communication (NFC) interface, and/or the like. According to various implementations, the electronic device 100 obtains finger manipulation data from the finger-wearable device via the communication interface 190, as will be further described below.

FIG. 2 is a block diagram of an example of a finger-wearable device 200. The finger-wearable device 200 includes memory 202 (which optionally includes one or more computer readable storage mediums), memory controller 222, one or more processing units (CPUs) 220, peripherals interface 218, RF circuitry 208, and input/output (I/O) subsystem 206. These components optionally communicate over one or more communication buses or signal lines 203. One of ordinary skill in the art will appreciate that the finger-wearable device 200 illustrated in FIG. 2 is one example of a finger-wearable device, and that the finger-wearable device 200 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

The finger-wearable device 200 includes a power system 262 for powering the various components. The power system 262 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

The memory 202 optionally includes high-speed random-access memory and optionally also includes non-volatile memory, such as one or more flash memory devices, or other non-volatile solid-state memory devices. Access to memory 202 by other components of the finger-wearable device 200, such as CPU(s) 220 and the peripherals interface 218, is, optionally, controlled by memory controller 222.

The peripherals interface 218 can be used to couple input and output peripherals of the finger-wearable device 200 to the CPU(s) 220 and the memory 202. The one or more processors 220 run or execute various software programs and/or sets of instructions stored in memory 202 to perform various functions for the finger-wearable device 200 and to process data.

In some implementations, the peripherals interface 218, the CPU(s) 220, and the memory controller 222 are, optionally, implemented on a single chip, such as chip 204. In some implementations, they are implemented on separate chips.

The RF (radio frequency) circuitry 208 receives and sends RF signals, also called electromagnetic signals. The RF circuitry 208 converts electrical signals to/from electromagnetic signals and communicates with the electronic device 100 or 310, communications networks, and/or other communications devices via the electromagnetic signals. The RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The I/O subsystem 206 couples input/output peripherals on the finger-wearable device 200, such as other input or control devices 216, with the peripherals interface 218. The I/O subsystem 206 optionally includes one or more positional sensor controllers 258, one or more intensity sensor controllers 259, a haptic feedback controller 261, and one or more other input controllers 260 for other input or control devices. The one or more other input controllers 260 receive/send electrical signals from/to other input or control devices 216. The other input or control devices 216 optionally include physical buttons (e.g., push buttons, rocker buttons, etc.), dials, slider switches, click wheels, and so forth. In some implementations, the other input controller(s) 260 are, optionally, coupled with any (or none) of the following: an infrared port and/or a USB port.

In some implementations, the finger-wearable device 200 includes one or more positional sensors 266 that output positional data associated with the finger-wearable device 200. The positional data is indicative of a position, orientation, or movement of the finger-wearable device 200, such as a rotational movement or translational movement of the finger-wearable device 200. For example, the positional sensor(s) 266 include an inertial measurement unit (IMU) that provides 3D rotational data, such as roll, pitch, and yaw information. To that end, the IMU may include a combination of an accelerometer, gyroscopes, and magnetometers. As another example, the positional sensor(s) 266 include a magnetic sensor that provides 3D positional data and/or 3D orientation data, such as the position of the finger-wearable device 200. For example, the magnetic sensor measures weak magnetic fields in order to determine a position of the finger-wearable device 200.

In some implementations, the finger-wearable device 200 includes one or more contact intensity sensors 268 for detecting intensity (e.g., pressure) of a contact associated with a gesture performed by the finger-wearable device 200. The one or more contact intensity sensors 268 output contact intensity data associated with the finger-wearable device 200. As one example, the contact intensity data is indicative of the pressure exerted by a finger (wearing the finger-wearable device) tapping on a physical surface. The one or more contact intensity sensors 268 may include an interferometer. The one or more contact intensity sensors 268 may include one or more piezoresistive strain gauges, capacitive force sensors, electric force sensors, piezoelectric force sensors, optical force sensors, capacitive touch-sensitive surfaces, or other intensity sensors.

The finger-wearable device 200 optionally includes one or more tactile output generators 263 for generating tactile outputs on the finger-wearable device 200. In some implementations, the term "tactile output" refers to physical displacement of an accessory (e.g., the finger-wearable device 200) of an electronic device (e.g., the electronic device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of the finger-wearable device 200) is, optionally, interpreted by the user as a "click" of a physical actuator button. In some cases, a user will feel a tactile sensation such as a "click" even when there is no movement of a physical actuator button associated with the finger-wearable device that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the electronic device or a component thereof that will generate the described sensory perception for a typical (or average) user.

FIG. 2 shows the tactile output generator(s) 263 coupled with a haptic feedback controller 261. The tactile output generator(s) 263 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The tactile output generator(s) 263 receive tactile feedback generation instructions from a haptic feedback system 234 and generates tactile outputs on the finger-wearable device 200 that are capable of being sensed by a user of the finger-wearable device 200.

In some implementations, the software components stored in the memory 202 include an operating system 226, a communication system (or set of instructions) 228, a position system (or set of instructions) 230, a contact intensity system (or set of instructions) 232, a haptic feedback system (or set of instructions) 234, and a gesture interpretation system (or set of instructions) 236. Furthermore, in some implementations, the memory 202 stores device/global internal state associated with the finger-wearable device. The device/global internal state includes one or more of: sensor state, including information obtained from the finger wearable device's various sensors and other input or control devices 216; positional state, including information regarding the finger-wearable device's position (e.g., position, orientation, tilt, roll and/or distance) relative to an electronic device (e.g., the electronic device 100); and location information concerning the finger-wearable device's absolute position.

The operating system 226 includes various software components and/or drivers for controlling and managing general system tasks (e.g., memory management, power management, etc.) and facilitates communication between various hardware and software components.

The communication system 228 facilitates communication with other devices (e.g., the electronic device 100 or the electronic device 310), and also includes various software components (e.g., for handling data received by the RF circuitry 208) that are adapted for coupling directly to other devices or indirectly over a network (e.g., the Internet, wireless LAN, etc.).

The position system 230, in conjunction with positional data from the one or more positional sensor(s) 266, optionally detects positional information concerning the finger-wearable device 200. The position system 230 optionally includes software components for performing various operations related to detecting the position of the finger-wearable device 200 and detecting changes to the position of the finger-wearable device 200 in a particular frame of reference. In some implementations, the position system 230 detects the positional state of the finger-wearable device 200 relative to the electronic device and detects changes to the positional state of the finger-wearable device 200 relative to the electronic device. As noted above, in some implementations, the electronic device 100 or 310 determines the positional state of the finger-wearable device 200 relative to the electronic device and changes to the positional state of the finger-wearable device 200 using information from the position system 230.

The contact intensity system 232, in conjunction with contact intensity data from the one or more contact intensity sensor(s) 268, optionally detects contact intensity information associated with the finger-wearable device 200. The contact intensity system 232 includes software components for performing various operations related to detection of contact, such as detecting the intensity and/or duration of a contact between the finger-wearable device 200 and a desk surface. Determining movement of the point of contact, which is represented by a series of contact intensity data, optionally includes determining speed (magnitude), velocity (magnitude and direction), and/or an acceleration (a change in magnitude and/or direction) of the point of contact.

The haptic feedback system 234 includes various software components for generating instructions used by the tactile output generator(s) 263 to produce tactile outputs at one or more locations on finger-wearable device 200 in response to user interactions with the finger-wearable device 200.

The finger-wearable device 200 optionally includes a gesture interpretation system 236. The gesture interpretation system 236 coordinates with the position system 230 and/or the contact intensity system 232 in order to determine a gesture performed by the finger-wearable device. For example, the gesture includes one or more of: a pinch gesture, a pull gesture, a pinch and pull gesture, a rotational gesture, a tap gesture, and/or the like. In some implementations, the finger-wearable device 200 does not include a gesture interpretation system, and an electronic device or a system (e.g., the gesture interpretation system 445 in FIG. 4) determines a gesture performed by the finger-wearable device 200 based on finger manipulation data from the finger-wearable device 200. In some implementations, a portion of the gesture determination is performed at the finger-wearable device 200, and a portion of the gesture determination is performed at an electronic device/system. In some implementations, the gesture interpretation system 236 determines a time duration associated with a gesture. In some implementations, the gesture interpretation system 236 determines a contact intensity associated with a gesture performed by the finger-wearable device 200.

Each of the above identified modules and applications correspond to a set of executable instructions for performing one or more functions described above and the methods described in this application (e.g., the computer-implemented methods and other information processing methods described herein). These systems (i.e., sets of instructions) need not be implemented as separate software programs, procedures or modules, and thus various subsets of these modules are, optionally, combined or otherwise re-arranged in various embodiments. In some implementations, the memory 202 optionally stores a subset of the systems and data structures identified above. Furthermore, the memory 202 optionally stores additional systems and data structures not described above.

FIGS. 3A-3V are examples of an electronic device 310 registering various engagement events based on finger manipulation data and untethered inputs in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As illustrated in FIG. 3A, an electronic device 310 is associated with (e.g., operates according to) an operating environment 300. In some implementations, the electronic device 310 is similar to and adapted from the electronic device 100 in FIG. 1. In some implementations, the electronic device 310 generates one of the XR settings described above. The electronic device 310 includes a display 312 that is associated with a viewable region 314 of the operating environment 300. For example, in some implementations, the electronic device 310 includes an image sensor associated with a field-of-view corresponding to the viewable region 314, and the electronic device 310 composites pass through image data from the image sensor with computer-generated content. As another example, in some implementations, the electronic device 310 includes a see-through display 312 that enables ambient light to enter from a physical environment, resulting in the viewable region 314. The operating environment 300 includes a physical table 302, and the viewable region 314 includes a portion of the physical table 302.

Moreover, a finger-wearable device 320 is on a finger of the first hand 52 of the user 50. In some implementations, the finger-wearable device 320 is similar to and adapted from the finger-wearable device 200 illustrated in FIG. 2. The electronic device 310 includes a communication interface (e.g., the communication interface 190 in FIG. 1) that is provided to communicate with the finger-wearable device 320, and optionally to communicate with a physical proxy object that includes sensors. The electronic device 310 obtains finger manipulation data from the finger-wearable device 320. For example, the electronic device 310 obtains a combination of positional data (e.g., output by positional sensor(s) of the finger-wearable device 320) and contact intensity data (e.g., output by contact intensity sensor(s) of the finger-wearable device 320).

Moreover, in some implementations, a second hand 54 of the user 50 is holding the electronic device 310. For example, in some implementations, the electronic device 310 corresponds to a smartphone, laptop, tablet, etc.

In some implementations, the electronic device 310 corresponds to a head-mountable device (HMD) that includes an integrated display (e.g., a built-in display) that displays a representation of the operating environment 300. In some implementations, the electronic device 310 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 310). For example, in some implementations, the electronic device 310 slides/snaps into or otherwise attaches to the head-mountable enclosure. In some implementations, the display of the device attached to the head-mountable enclosure presents (e.g., displays) the representation of the operating environment 300. For example, in some implementations, the electronic device 310 corresponds to a mobile phone that can be attached to the head-mountable enclosure.

In some implementations, the electronic device 310 includes an image sensor, such as a scene camera. For example, the image sensor obtains image data that characterizes the operating environment 300, and the electronic device 310 composites the image data with computer-generated content in order to generate display data for display on the display 312. The display data may be associated with an XR environment. For example, the image sensor obtains image data that represents the portion of the physical table 302, and the generated display data displayed on the display 312 also represents the portion of the physical table 302 (See FIG. 3B).

In some implementations, the electronic device 310 includes a see-through display. The see-through display permits ambient light from the physical environment through the see-through display, and the representation of the physical environment is a function of the ambient light. For example, the see-through display is a translucent display, such as glasses with optical see-through. In some implementations, the see-through display is an additive display that enables optical see-through of the physical surface, such as an optical HMD (OHMD). For example, unlike purely compositing using a video stream, the additive display is capable of reflecting projected images off of the display while enabling the user to see through the display. In some implementations, the see-through display includes a photochromic lens. The HMD adds computer-generated objects to the ambient light entering the see-through display in order to enable display of the operating environment 300. For example, a see-through display 312 permits ambient light from the operating environment 300 that includes the portion of the physical table 302, and thus the see-through display 312 also represents the portion of the physical table 302 (See FIG. 3B).

As further illustrated in FIG. 3A, the electronic device 310 establishes a communication link with the finger-wearable device 320, as is indicated by a communication link line 322 (illustrated for purely explanatory purposes). Establishing the link between the electronic device 310 and the finger-wearable device 320 is sometimes referred to as pairing or tethering. One of ordinary skill in the art will appreciate that the electronic device 310 may communicate with the finger-wearable device 320 according to a variety of communication protocols, such as BLUETOOTH, IEEE 802.11x, NFC, etc.

In some implementations, in response to establishing the communication link with the finger-wearable device 320, the electronic device 310 (e.g., automatically) displays, on the display 312, a plurality of computer-generated objects. In some implementations, in response to receiving a user input, the electronic device 310 displays, on the display 312, the plurality of computer-generated objects. As one example, as illustrated in FIGS. 3A and 3B, the plurality of computer-generated objects includes a computer-generated soccer ball 330, a computer-generated cube 332, and a computer-generated basketball 334.

Figure 5:
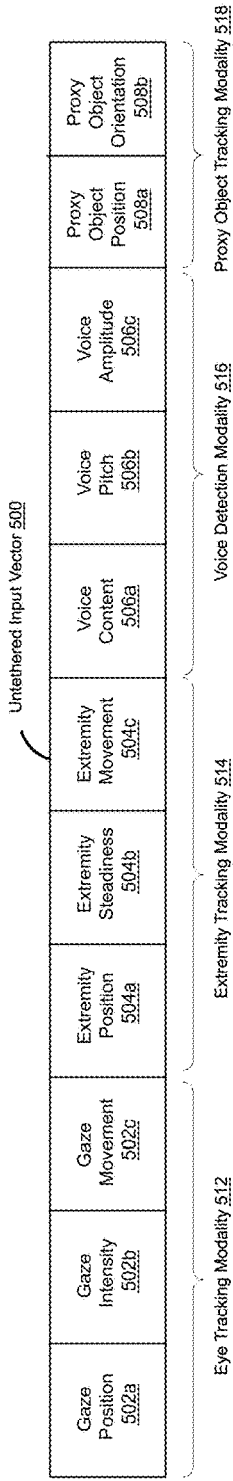
FIG. 5 is an example of an untethered input vector in accordance with some implementations.

FIGS. 3C-3G illustrate an example of the electronic device 310 utilizing a combination of eye tracking and finger manipulation data in order to register an engagement event. The electronic device 310 includes an untethered input detection system that receives an untethered input vector, an example of which is illustrated in FIG. 5 (untethered input vector 500). The untethered input vector includes a plurality of untethered input indicator values. Each of the plurality of untethered input indicator values is associated with one of a plurality of untethered input modalities, such as an eye tracking modality, an extremity tracking modality, a voice detection modality, and/or the like.

For example, as illustrated in FIG. 3C, the electronic device 310 includes an untethered input detection system 340 that includes an eye tracking subsystem 341. The eye tracking subsystem 341 outputs one or more eye tracking indicator values. For example, the eye tracking subsystem 341 includes eye tracking sensor(s) (e.g., the eye tracking sensor(s) 164 in FIG. 1) and an eye tracking controller (e.g., the eye tracking controller 160 in FIG. 1). The one or more eye tracking indicator values are associated with the eye tracking modality. For example, in some implementations, the one or more eye tracking indicator values include a gaze position, a gaze intensity, a gaze movement, etc.

Moreover, the electronic device 310 includes an object disambiguator 342 that disambiguates one or more computer-generated objects based on the eye tracking indicator value(s). Namely, based on the eye tracking indicator value(s), the object disambiguator 342 determines an eye gaze 343 (dotted line illustrated for purely explanatory purposes) that is associated with one or more eyes of the user 50. Based on the eye gaze 343, the object disambiguator 342 determines a user focus is associated with (e.g., directed onto) the computer-generated cube 332, as is indicated by a reticle 344. In some implementations, the electronic device 310 displays the reticle 344 in order to provide feedback to the user 50, thereby reducing erroneous (e.g., unintended) inputs and reducing resource utilization by the electronic device 310. In some implementations, rather than displaying the reticle 344, the electronic device 310 provides another mode of feedback for indicating object disambiguation, such as haptic feedback or audio feedback.

In some implementations, in response to determining the user focus is associated with the computer-generated cube 332, the electronic device 310 disambiguates (e.g., selects) the computer-generated cube 332. In some implementations, the electronic device 310 indicates the disambiguation by changing an appearance of the computer-generated cube 332, such as changing the computer-generated cube 332 from having solid lines to dotted lines, as illustrated in FIG. 3D. Changing the appearance of the computer-generated cube 332 provides feedback to the user 50, thereby reducing erroneous (e.g., unintended) inputs and reducing resource utilization by the electronic device 310. One of ordinary skill in the art will appreciate that, in some implementations, the electronic device 310 does not change the appearance of disambiguated content, or changes the appearance differently than as described with reference to FIG. 3D.

As illustrated in FIGS. 3E and 3F, the finger-wearable device 320 performs a counterclockwise rotational gesture that is associated with (e.g., directed to within) the computer-generated cube 332, as is indicated by rotational indictor 346 (illustrated for purely explanatory purposes). Accordingly, based on positional data (e.g., IMU data or magnetic sensor data) from the finger-wearable device 320, the electronic device 310 determines that the finger-wearable device 320 performs the counterclockwise rotational gesture.

In response to determining that the finger-wearable device 320 performs the counterclockwise rotational gesture associated with the computer-generated cube 332, the electronic device 310 correspondingly manipulates the computer-generated cube 332. Accordingly, as illustrated in FIG. 3F, the electronic device 310 rotates, on the display 312, the computer-generated cube 332 according to the rotational gesture performed by the finger-wearable device 320. For example, the electronic device 310 rotates the computer-generated cube 332 counterclockwise to a degree corresponding to a degree of rotation associated with the counterclockwise rotational gesture performed by the finger-wearable device 320. In some implementations, after manipulating the computer-generated cube 332, the electronic device 310 restores the appearance of the computer-generated cube 332 to a pre-selected state. For example, as illustrated in FIG. 3G, the electronic device 310 changes the appearance of the rotated computer-generated cube 332 from dotted lines back to having solid lines.

Accordingly, as illustrated in FIGS. 3C-3G, the electronic device 310 registers an engagement event with respect to the computer-generated cube 332 based on finger manipulation data from the finger-wearable device 320 and the eye tracking indicator value(s). Namely, the engagement event includes a disambiguation (e.g., selection) of the computer-generated cube 332 based on the eye tracking indicator value(s), and a manipulation of the disambiguated object based on the finger manipulation data. One of ordinary skill in the art will appreciate that, in some implementations, the engagement event includes a different combination of an untethered input and finger manipulation data, such as disambiguating an object based on the untethered input and a confirmation of the disambiguation based on the finger manipulation data.

In some implementations, the electronic device 310 manipulates a disambiguated computer-generated object based on finger manipulation data, independent of a distance between the finger-wearable device 320 and the disambiguated computer-generated object. For example, while performing a gesture, the finger-wearable device 320 is outside of the viewable region 314 or is within the viewable region 314 but far away from the disambiguated computer-generated. As one example, the electronic device 310 disambiguates a computer-generated object based on an eye tracking input (e.g., eye gaze directed to within the computer-generated object), and thereafter uses finger manipulation data that is indicative of a rotational gesture performed outside of the viewable region 314 in order to rotate the disambiguated computer-generated object.

FIGS. 3H-3K illustrate an example of the electronic device 310 utilizing a combination of voice detection and finger manipulation data in order to register an engagement event. As illustrated in FIG. 3H, the electronic device 310 includes an untethered input detection system 350, which itself includes a voice detection subsystem 351. The voice detection subsystem 351 detects a voice (e.g., from the user 50) that corresponds to a user speech pattern of "Select the balls" 348, and outputs one or more voice detection indicator values. The voice detection indicator value(s) are associated with a voice detection modality of an untethered input vector. For example, the voice detection indicator value(s) includes a combination of a voice content indicator value, a voice pitch indicator value, a voice amplitude indicator value, etc. To that end, the voice detection subsystem 351 includes an audio sensor (e.g., a microphone) that detects the voice. In some implementations, the voice detection subsystem 351 includes a speech recognition engine that semantically identifies the speech pattern within the voice. As one example, in some implementations, the voice detection subsystem 351 performs natural language processing (NLP) in order to generate the voice content indicator value, based on audio data from the audio sensor. Accordingly, the voice detection subsystem 351 semantically identifies the user speech pattern as "Select the balls."

Based on the voice detection indicator value(s), the object disambiguator 342 disambiguates the balls on the display 312, but not the computer-generated cube 332 because it is not a ball. As illustrated in FIG. 3H, the object disambiguator 342 disambiguates the computer-generated soccer ball 330, as is indicated by first line 352a, and disambiguates the computer-generated basketball 334, as is indicated by second line 352b. The first line 352a and the second line 352b are illustrated in FIG. 3H for purely explanatory purposes.

In some implementations, the electronic device 310 changes an appearance of the computer-generated soccer ball 330 and the computer-generated basketball 334 based on the disambiguation. For example, as illustrated in FIG. 3I, the electronic device 310 changes the computer-generated soccer ball 330 and the computer-generated basketball 334 from having solid lines to having dotted lines. As described above, changing the appearance provides useful feedback to the user 50.

As illustrated in FIGS. 3J and 3K, the finger-wearable device 320 performs a downward movement gesture, as is indicated by movement line 354 (illustrated for purely explanatory purposes). Accordingly, based on positional data from the finger-wearable device 320, the electronic device 310 determines that the finger-wearable device 320 performs the downward movement gesture. For example, the positional data includes magnetic sensor data output from a magnetic sensor that is integrated within the finger-wearable device 320. According to various implementations, the magnetic sensor data enables the electronic device 310 to perform six degree-of-freedom (6 DOF) tracking of the finger-wearable device 320.

In response to determining that the finger-wearable device 320 performs the downward movement gesture, the electronic device 310 correspondingly manipulates the disambiguated computer-generated objects. Namely, as illustrated in FIG. 3K, the electronic device 310 moves the computer-generated soccer ball 330 and the computer-generated basketball 334 downwards on the display 312. For example, the electronic device 310 moves the computer-generated soccer ball 330 and the computer-generated basketball 334 a distance that approximately corresponds to a distance associated with the downward movement gesture performed by the finger-wearable device 320.

In some implementations, the electronic device 310 manipulates a disambiguated computer-generated object based on receiving finger manipulation data within a threshold time of the disambiguation. For example, when the electronic device 310 receives finger manipulation data indicative of a particular gesture (e.g., a rotation or movement) less than two seconds after disambiguating a computer-generated object, the electronic device 310 manipulates the disambiguated computer-generated object, but does not manipulate when receiving the finger manipulation data more than two seconds after disambiguating.

In some implementations, the electronic device 310 manipulates a disambiguated computer-generated object based on determining that finger manipulation data is indicative of a manipulation-triggering gesture type (e.g., pinch, tap, etc.). For example, in response to determining that the positional data and contact intensity data are together indicative of a user's finger (which is wearing the finger-wearable device 32) tapping on a physical table, the electronic device 310 begins utilizing subsequent finger manipulation data in order to manipulate a disambiguated computer-generated object.

Notably, in contrast to the gesture example provided with reference to FIGS. 3E and 3F, the electronic device 310 may manipulate an object based on finger manipulation data even when the finger-wearable device 320 is positioned more than a threshold distance away from the object (e.g., outside of the viewable region), or positioned outside a viewable region associated with a camera not used to generate displayable content (e.g., a camera used for extremity tracking). For example, the user 50, while sitting on a couch, rests the first hand 52 and the finger-wearable device 320 on an edge of the couch, enabling a more comfortable experience for the user 50 and thereby potentially reducing erroneous inputs from the finger-wearable device 320.

Accordingly, as illustrated in FIGS. 3H-3K, the electronic device 310 registers an engagement event with respect to the computer-generated soccer ball 330 and the computer-generated basketball 334 based on the voice detection indicator value(s) and the finger manipulation data from the finger-wearable device 320. Namely, the engagement event includes a disambiguation (e.g., selection) of the computer-generated soccer ball 330 and the computer-generated basketball 334 based on the voice detection indicator value(s), and a manipulation of the disambiguated objects based on the finger manipulation data.

FIGS. 3L-3P illustrate an example of the electronic device 310 concurrently (or near concurrently) utilizing a combination of extremity tracking and finger manipulation data in order to register an engagement event. One of ordinary skill in the art will appreciate that, in some implementation, the electronic device 310 may concurrently (or near concurrently) utilize additional or different untethered inputs, such as eye tracking, voice detection, etc., in order to register an engagement event.

As illustrated in FIG. 3L, the display 312 includes a representation of the first hand 52 with the finger-wearable device 320, and also includes a representation of the second hand 54 of the user 50. The electronic device 310 includes an untethered input detection system 355, which itself includes an extremity tracking subsystem 356. The extremity tracking subsystem 356 outputs one or more extremity tracking indicator values. The extremity tracking indicator value(s) are associated with an extremity tracking modality of an untethered input vector. For example, the extremity tracking indicator value(s) include a combination of an extremity position indicator value, an extremity steadiness indicator value, an extremity movement indicator value, etc. For example, the extremity tracking subsystem 356 includes an extremity tracking sensor (e.g., the extremity tracking sensor 150 in FIG. 1) and an extremity tracking sensing controller (e.g., the extremity tracking sensing controller 180 in FIG. 1). In some implementations, the extremity tracking subsystem 356 performs various computer vision techniques (optionally with the aid of a neural network) in order to identify the second hand 54 of the user 50. For example, the extremity tracking subsystem 356 performs semantic segmentation with respect to pass through image data from an image sensor.

As one example, with reference to FIG. 3L, the extremity tracking subsystem 356 determines an extremity position indicator value associated with the second hand 54, as is indicated by extremity tracking line 357 (illustrated for purely explanatory purposes). The extremity position indicator value is associated with the middle finger of the second hand 54, but one of ordinary skill in the art will appreciate that the extremity indicator value(s) may be associated with a different finger or multiple fingers of the second hand 54, and/or the base (e.g., palm) of the second hand 54.

Based on the extremity tracking indicator value(s), the object disambiguator 342 disambiguates the computer-generated basketball 334. For example, in some implementations, because the extremity position indicator value indicates that the middle finger of the second hand 54 is closer to the computer-generated basketball 334 than to the other two computer-generated objects, the object disambiguator 342 disambiguates the computer-generated basketball 334. For example, as illustrated in FIG. 3M, the electronic device 310 changes the appearance of the computer-generated basketball 334 from having solid lines to dotted lines, as indicated by a third line 358. The third line 358 is illustrated for purely explanatory purposes. Changing the appearance of the disambiguated object provides feedback to the user 50, as described above.

As illustrated in FIG. 3N, the second hand 54 begins to perform a leftward movement concurrently (or near concurrently) with the finger-wearable device 320 performing a tap gesture on the physical table 302. The leftward movement of the second hand 54 is indicated by a movement line 359, and the tap gesture is indicated by a tap indicator 360, both of which are illustrated for purely explanatory purposes. Accordingly, the electronic device 310 obtains finger manipulation data from the finger-wearable device 320 indicative of the tap gesture while detecting (via the extremity tracking subsystem 356) the leftward movement of the second hand 54.

As illustrated in FIG. 3O, the second hand 54 is approximately halfway through finishing the leftward movement, whereas the finger-wearable 320 has finished the tap gesture. The extremity tracking subsystem 356 accordingly updates the extremity position indicator value, and outputs the updated extremity position indicator value to an object manipulator 370 included in the electronic device 310. Accordingly, the object manipulator 370 moves the computer-generated basketball 334 leftwards according to the movement of the second hand 54, as illustrated in FIG. 3O by an object manipulation line 372 (illustrated for purely explanatory purposes). Moreover, the electronic device 310 detects the tap gesture based on the finger manipulation data. For example, in some implementations, the electronic device 310 detects the tap gesture based on positional data from the finger-wearable device 310 indicating that the finger-wearable device 310 moves in a downward direction beyond a threshold distance. As another example, in some implementations, the electronic device 310 detects the tap gesture based on a combination of the positional data and contact intensity data indicating that a finger, wearing the finger-wearable device 320, exerts a threshold amount of force of pressure on the physical table 302, or detects a threshold amount of force or pressure exerted by a finger of the user 50 on the physical table 302. Based on detecting the tap gesture, the object manipulator 370 changes the appearance of the computer-generated basketball 334 from having no fill in FIG. 3N to having a patterned fill in FIG. 3O. One of ordinary skill in the art will appreciate that, in some implementations, in response to detecting a particular gesture performed by the finger-wearable device 320, the object manipulator 370 changes the appearance of an object in a different way, such as resizing or moving the object. As illustrated in FIG. 3P, the second hand 54 finishes the leftward movement. Accordingly, the object manipulator 370 moves the patterned-filled computer-generated basketball 334 further leftwards.

FIGS. 3Q-3V illustrate an example of manipulating a computer-generated object based on a corresponding manipulation of a physical proxy object by the user 50. For example, as illustrated in FIG. 3Q, the physical proxy object corresponds to a physical car 380, which lies on the physical table 302. While the physical car 380 is shown as being presented in display 312, in some implementations, the physical car 380 may not be displayed or a different visual representation (e.g., a ghosted outline, a different shape, etc.) may be displayed. According to various implementations, the electronic device 310 receives an untethered input vector, and uses the untethered input vector in order to track the physical car 380.

To that end, as illustrated in FIG. 3R, the electronic device 310 includes an untethered input detection system 382. The untethered input detection system 382 includes a proxy object identifier 384. The proxy object identifier 384 outputs one or more proxy object tracking indicator values associated with a proxy object tracking modality. The proxy object identifier 384 determines a proxy object position indicator value associated with the physical car 380, as is indicated by a proxy object tracking line 386 (illustrated for purely explanatory purposes). For example, the proxy object identifier 384 performs a computer-vision technique with respect to image data in order to identify the physical car 380.

As further illustrated in FIG. 3R, the finger-wearable device 320 moves within the viewable region associated with the display 312. As discussed above, the finger-wearable device 320 can generate finger manipulation data including sensor data, such as positional data (e.g., IMU data or magnetic sensor data) and contact intensity data (e.g., interferometer data). The electronic device 310 obtains the finger manipulation data from the finger-wearable device 320 via the communication interface.

As further illustrated in FIG. 3R, the computer-generated cube 332 is currently selected, as is indicated by the computer-generated cube 332 having dotted line boundaries. For example, the electronic device 310 selects the computer-generated cube 332 via the eye tracking described with reference to FIGS. 3C and 3D. In some implementations, the computer-generated cube 332 may instead be selected based on the physical car 380 being within a threshold distance from the computer-generated cube 332.

In some implementations, the electronic device 310 associates a physical proxy object with a particular computer-generated object based on a function of finger manipulation data and proxy object tracking. While the physical proxy object is associated with the particular computer-generated object, the electronic device 310 may manipulate the particular computer-generated object based on a corresponding manipulation (e.g., rotation, translational movement, etc.) of the physical proxy object. For example, with reference to FIGS. 3S and 3T, the finger-wearable device 320 moves leftwards towards the physical car 380, as is indicated by movement line 388 (illustrated for purely explanatory purposes). After the leftwards movement, the finger-wearable device 320 satisfies a proximity threshold associated with the physical car 380. Namely, the finger-wearable device 320 satisfies the proximity threshold because the finger manipulation data indicates that the finger-wearable device 320 is less than a threshold distance from a proximity line 390, as is illustrated in FIGS. 3S and 3T. The proximity line 390 is illustrated for purely explanatory purposes. In some implementations, the proximity threshold can represent a value in which the user 50 is holding the proxy object. In some implementations, other proximity threshold values can be used.

In some implementations, based on the finger-wearable device 320 satisfying the proximity threshold and an input from the user 50 (e.g., the contact intensity data of the finger manipulation data indicating a tap or pinch gesture), the electronic device 310 associates the physical car 380 with the selected computer-generated object (e.g., computer-generated cube 332). For example, the physical car 380 may be associated with the computer-generated cube 332 when the user 50 grasps the physical car 380, brings the physical car 380 within a threshold distance from the computer-generated cube 332, and pinches the physical car 380 between the thumb and pointer finger of the user 50. In some implementations, the electronic device 310 associates the physical car 380 with the computer-generated cube 332 when the finger-wearable device 320 satisfies the proximity threshold for at least a threshold amount of time.

As illustrated in FIGS. 3U and 3V, while the physical car 380 is associated with the computer-generated cube 332, the electronic device 310 manipulates the computer-generated cube 332 based on a corresponding manipulation of the physical car 380. The electronic device 310 utilizes the one or more proxy object tracking indicator values, output by the proxy object identifier 384, in order to manipulate the computer-generated cube 332. For example, as illustrated in FIG. 3U, while the first hand 52 is contacting (e.g., pinching) the physical car 380, the first hand 52 rotates counterclockwise, as is indicated by counterclockwise indicator 392 (illustrated for purely explanatory purposes). Accordingly, as illustrated in FIG. 3V, the physical car 380 rotates counterclockwise, and the electronic device 310 correspondingly rotates the computer-generate cube 332 counterclockwise.

In some implementations, the physical proxy object (e.g., physical car 380) can be disassociated from the computer-generated object (e.g., computer-generated cube 332) based on the finger manipulation data. For example, in response to determining that contact intensity data indicates that the user 50 is no longer performing a pinch gesture, the electronic device 310 disassociates the proxy object from the computer-generated object, such that movement of the physical proxy object no longer affects the computer-generated object. As another example, in response to determining that the finger manipulation data indicates that the user 50 is performing another pinch/tap gesture, the electronic device 310 disassociates the proxy object from the computer-generated object.

By using a physical proxy object, the user 50 experiences haptic feedback associated with holding and manipulating the physical proxy object, thereby providing an enhanced user experience as compared with pure extremity tracking systems. Moreover, the physical proxy object tracking enables the user 50 to manipulate any type of physical object in order to manipulate a computer-generated object. Additionally, manipulation via a physical proxy object enables the user 50 to avoid awkward angles associated with the usage of some hand-held controllers.

In some implementations, a physical proxy object includes one or more sensors, such as a positional sensor and/or an orientation sensor. For example, the one or more sensors output sensor data that is characterized by six degree-of-freedom (6 DOF) information. Thus, in addition to or instead of using computer-vision based physical proxy object tracking, in some implementations, the electronic device 310 manipulates a computer-generated object based on proxy object manipulation data (e.g., the sensor data) from the physical proxy object as the user 50 manipulates the physical proxy object.

Figure 4:
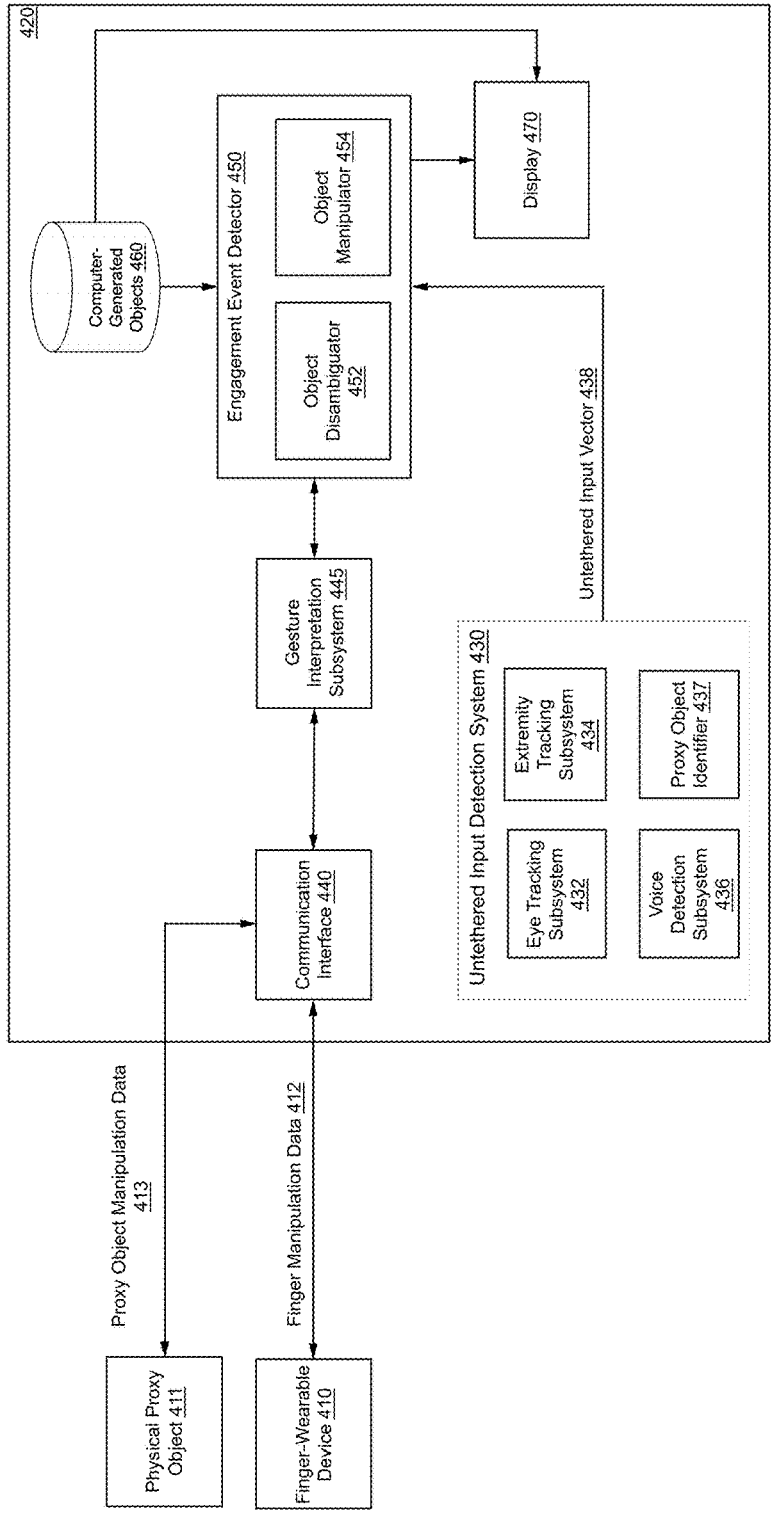
FIG. 4 is an example of a block diagram of a system for registering engagement events based on finger manipulation data and untethered inputs in accordance with some implementations.

FIG. 4 is an example of a block diagram of a system 420 for registering engagement events based on finger manipulation data and untethered inputs in accordance with some implementations. According to various implementations, the system 420 or portions thereof are integrated in an electronic device (e.g., the electronic device 100 or the electronic device 310).

The system 420 includes a communication interface 440 (e.g., the communication interface 190 in FIG. 1) that is provided to communicate with a finger-wearable device 410, and optionally with a physical proxy object 411 that includes sensor(s). In some implementations, the finger-wearable device 410 is similar to and adapted from one of the finger-wearable device 200 in FIG. 2 or the finger-wearable device 320 in FIGS. 3A-3V.

The system 420 obtains finger manipulation data 412 via the communication interface 440. In some implementations, the finger manipulation data 412 is indicative of a gesture performed by the finger-wearable device 410, such as a tap gesture, rotational gesture, swipe gesture, and/or the like. To that end, in some implementations, the system 420 includes a gesture interpretation subsystem 445 that determines the gesture based on the finger manipulation data 412. For example, the finger manipulation data 412 includes a combination of positional data (e.g., position, orientation, movement) and contact intensity data (e.g., interferometer data) associated with the finger-wearable device 410, and the gesture interpretation subsystem 445 determines a gesture based on the finger manipulation data 412.

In some implementations, the system 420 obtains proxy object manipulation data 413 from a physical proxy object 411 via the communication interface 440. For example, in some implementations, the physical proxy object 411 includes one or more sensors, such as an orientation/position sensor (e.g., an IMU). The one or more sensors output corresponding sensor data, which the system 420 receives via the communication interface 440.

The system 420 includes an untethered input detection system 430 that outputs an untethered input vector 438. The untethered input vector 438 includes a plurality of untethered input indicator values. Each of the plurality of untethered input indicator values is associated with one of a plurality of untethered input modalities. To that end, in various implementations, the untethered input detection system 430 includes one or more of an eye tracking subsystem 432, an extremity tracking subsystem 434, a voice detection subsystem 436, a proxy object identifier 437, etc.

The eye tracking subsystem 432 outputs one or more eye tracking indicator values associated with an eye tracking modality. For example, with reference to the untethered input vector 500 illustrated in FIG. 5, the one or more eye tracking indicator values include a combination of a gaze position indicator value 502a, a gaze intensity indicator value 502b, and a gaze movement indicator value 502c, all of which are associated with an eye tracking modality 512.

The extremity tracking subsystem 434 outputs one or more eye tracking indicator values associated with an extremity tracking modality. For example, with reference to the untethered input vector 500, the one or more extremity tracking indicator values include a combination of an extremity position indicator value 504a, an extremity steadiness intensity indicator value 504b, and an extremity movement indicator value 504c, all of which are associated with an extremity tracking modality 514. In some implementations, the extremity tracking subsystem 434 performs a computer-vision technique in order to identify an extremity of a user. For example, in some implementations, the extremity tracking subsystem 434 performs semantic segmentation with respect to image data that represents an extremity.

The voice detection subsystem 436 outputs one or more voice detection indicator values associated with a voice detection modality. For example, with reference to the untethered input vector 500, the one or more voice detection indicator values include a combination of a voice content indicator value 506a, a voice pitch indicator value 506b, and a voice amplitude indicator value 506c, all of which are associated with a voice detection modality 516.

The proxy object identifier 437 outputs one or more proxy object tracking indicator values associated with a proxy object tracking modality, which is associated with a physical proxy object. For example, with reference to the untethered input vector 500, the proxy object tracking indicator values include a combination of a proxy object position indicator value 508a and a proxy object orientation indicator value 508b, both of which are associated with a proxy object tracking modality 518. In some implementations, the proxy object identifier 437 performs a computer-vision technique in order to identify a physical proxy object. For example, in some implementations, the proxy object identifier 437 performs semantic segmentation with respect to image data that represents a physical proxy object.

The system 420 includes an engagement event detector 450. The engagement event detector 450 registers an engagement event with respect to a first one of the plurality of computer-generated objects 460 based on at least a portion of the untethered input vector 438 and the finger manipulation data 412. The engagement event may correspond to a combination of disambiguation of an object, conformation of disambiguation of the object, manipulation of the object, and/or the like. To those ends, in some implementations, the engagement event detector 450 includes an object disambiguator 452 and an object manipulator 454. The object disambiguator 452 may disambiguate one or more of the plurality of computer-generated objects 460 based on a combination of the finger manipulation data 412 and the untethered input vector 438. The object manipulator 454 may manipulate (e.g., changes an appearance of via a display 470) one or more of the plurality of computer-generated objects 460 based on a combination of the finger manipulation data 412 and the untethered input vector 438. Various examples of utilizing a portion of the untethered input vector 438 and the finger manipulation data 412 to engage with computer-generated objects are described with reference to FIGS. 3A-3V.

In some implementations, the engagement event detector 450 utilizes less than the entirety of the untethered input vector 438. For example, the engagement event detector 450 utilizes eye tracking indicator value(s) output by the eye tracking subsystem 432 and extremity tracking indicator value(s) output by the extremity tracking subsystem 434, but not voice detection indicator value(s) output by the voice detection subsystem 436. Accordingly, the system 420 may reduce utilization associated with processing certain untethered inputs in some circumstances. On the other hand, in some implementations, the engagement event detector 450 utilizes the entirety of the untethered input vector 438, thereby enabling greater user control.

Figure 6:
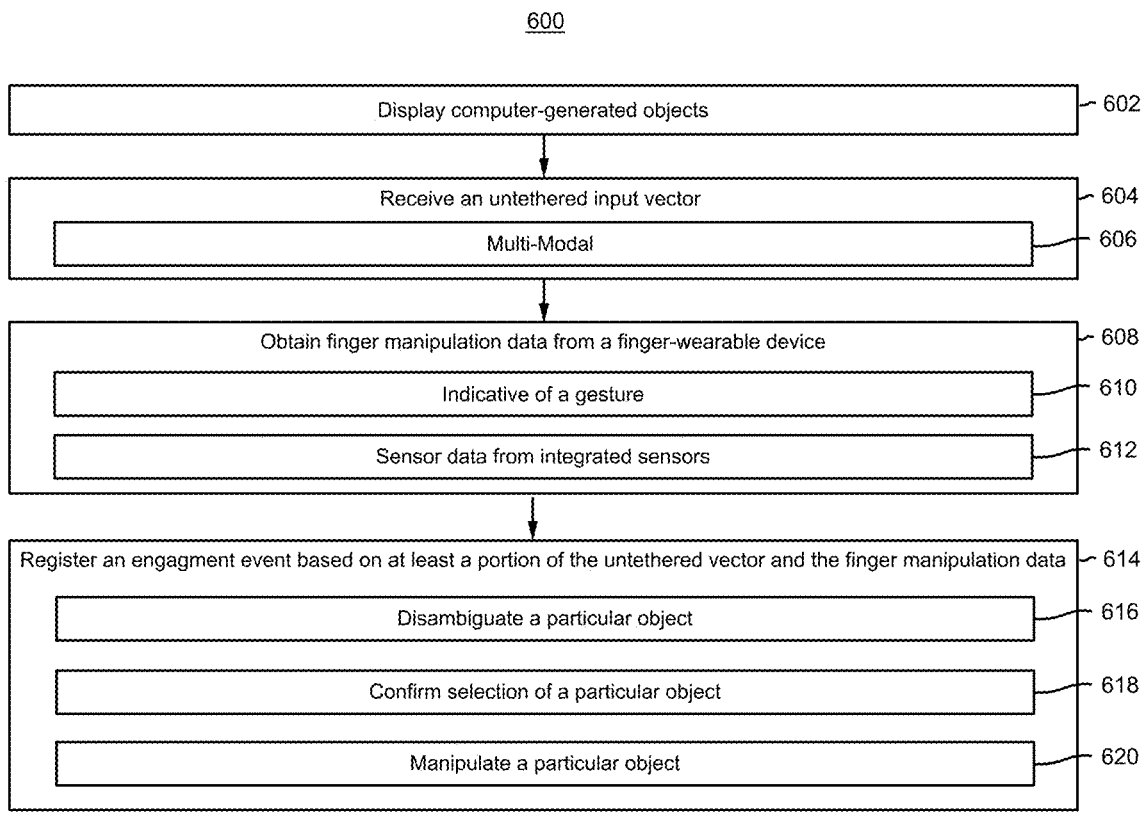
FIG. 6 is an example of a flow diagram of a method of registering engagement events based on finger manipulation data and untethered inputs in accordance with some implementations.

FIG. 6 is an example of a flow diagram of a method 600 of registering engagement events based on finger manipulation data and untethered inputs in accordance with some implementations. In various implementations, the method 600 or portions thereof are performed by an electronic device (e.g., the electronic device 100 in FIG. 1 or the electronic device 310 in FIGS. 3A-3P). In various implementations, the method 600 or portions thereof are performed by a head-mountable device (HMD). In some implementations, the method 600 is performed by processing logic, including hardware, firmware, software, or a combination thereof. In some implementations, the method 600 is performed by a processor executing code stored in a non-transitory computer-readable medium (e.g., a memory). In various implementations, some operations in method 600 are, optionally, combined and/or the order of some operations is, optionally, changed.

As represented by block 602, the method 600 includes displaying, on a display, a plurality of computer-generated objects. For example, with reference FIG. 3B, the electronic device 310 displays, on the display 312, the computer-generated soccer ball 330, the computer-generated cube 332, and the computer-generated basketball 334.

As represented by block 604, the method 600 includes receiving, via an untethered input detection system, an untethered input vector that includes a plurality of untethered input indicator values. For example, with reference to FIG. 4, the untethered input detection system corresponds to the untethered input detection system 430. As another example, as described with reference to FIGS. 3A-3P, the electronic device 310 receives various untethered indicator values. As represented by block 606, each of the plurality of untethered input indicator values is associated with one of a plurality of untethered input modalities. For example, with reference to FIG. 5, the plurality of untethered input modalities includes a combination of an eye tracking modality 512, an extremity tracking modality 514, and a voice detection modality 516.

As represented by block 608, the method 600 includes obtaining finger manipulation data from a finger-wearable device via a communication interface. For example, with reference to FIGS. 3A-3P, the electronic device 310 obtains various types of finger manipulation data from the finger-wearable device 320. The finger manipulation data may indicate positional (e.g., 6 degrees of freedom) and contact intensity (e.g., force or pressure) information of the finger-wearable device within a performance threshold. In some implementations, as represented by block 610, the finger manipulation data is indicative of a gesture performed by the finger-wearable device. For example, the gesture interpretation system 236 in FIG. 2 and the gesture interpretation subsystem 445 in FIG. 4 operate independently or together in order determine (e.g., identify) the gesture based on the finger manipulation data.

In some implementations, as represented by block 612, the finger manipulation data corresponds to sensor data associated with one or more sensors integrated within the finger-wearable device. For example, in some implementations, the sensor data includes positional data output from one or more positional sensors integrated in the finger-wearable device. As one example, the positional data is indicative of a rotational movement or translational movement of the finger-wearable device, such as is illustrated in FIGS. 3E, 3F, 3J, and 3K. The positional data may include inertial measurement unit (IMU) data (e.g., 3D rotational data) associated with an IMU that is integrated within the finger-wearable device. The positional data may also include magnetic sensor data (e.g., 3D positional data) associated with a magnetic sensor that is integrated within the finger-wearable device, wherein the magnetic sensor senses weak magnetic fields.

As another example, in some implementations, the sensor data includes contact intensity data output from a contact intensity sensor integrated in the finger-wearable device, such as in connection with the tap gesture 360 on the physical table 302 illustrated in FIGS. 3N and 3O. As one example, the contact intensity data includes interferometer data that is indicative of tap pressure associated with a gesture that is performed by the finger-wearable device. The interferometer data is from an interferometer that is integrated within the finger-wearable device. For example, the interferometer data indicates a pressure level associated with a finger, wearing the finger-wearable device, contacting a physical object. As one example, the finger-wearable device senses (e.g., via the contact intensity sensor) deflection of a pad of a finger when the finger contacts the physical surface. Accordingly, various implementations disclosed herein enable a user to feel a physical surface (and the texture of the physical surface) with which the user is interacting.

As yet another example, in some implementations, the sensor data includes a combination of the positional data and the contact intensity data.

As represented by block 614, the method 600 includes registering an engagement event with respect to a first one of the plurality of computer-generated objects based on at least a portion of the untethered input vector and the finger manipulation data. In some implementations, registering the engagement event is a function of the entirety of the untethered input vector. In some implementations, registering the engagement event is a function of less than the entirety of the untethered input vector.

As represented by block 616, in some implementations, registering the engagement event includes disambiguating the first one of the plurality of computer-generated objects based on the portion of the untethered input vector. In some implementations, disambiguating is performed by the object disambiguator 452 illustrated in FIG. 4. For example, with reference to FIGS. 3C-3G, the electronic device 310 disambiguates the computer-generated cube 332 based on eye tracking indicator value(s) included in an untethered input vector. As another example, with reference to FIGS. 3H and 3I, the electronic device 310 disambiguates the computer-generated soccer ball 330 and the computer-generated basketball 334 based on voice detection indicator value(s) associated with speech "Select the balls" 348. As yet another example, with reference to FIGS. 3L and 3M, the electronic device 310 disambiguates the computer-generated basketball 334 based on extremity tracking indicator value(s) associated with the second hand 54 of the user 50.

In some implementations, disambiguating the first one of the plurality of computer-generated objects is based on a proximity threshold and/or a time threshold. To that end, the method 600 includes determining a respective location based on the portion of the untethered input vector. Disambiguating the first one of the plurality of computer-generated objects includes determining that the respective location satisfies a proximity threshold with respect to the first one of the plurality of computer-generated objects. For example, an electronic device determines that a position indicator value (e.g., extremity position indicator value or eye gaze indicator value) indicates that the position of a user's hand or user's eye gaze is focused on a location of the display that is proximate to the first one of the plurality of computer-generated objects. In some implementations, disambiguating the first one of the plurality of computer-generated objects includes determining that the respective location satisfies the proximity threshold for a threshold amount of time.

As represented by block 618, in some implementations, registering the engagement event includes confirming a disambiguation of the first one of the plurality of computer-generated objects. For example, after disambiguating a particular computer-generated object based on an eye tracking indicator value, an electronic device displays an affordance to enable confirmation of the disambiguation. Continuing with this example, the affordance may include text corresponding to "You are looking at the floating basketball. Please double tap in order to confirm selection of the basketball."

As represented by block 620, in some implementations, registering the engagement event includes manipulating the first one of the plurality of computer-generated objects. In some implementations, manipulating is performed by the object manipulator 454 illustrated in FIG. 4. For example, manipulating may include one or more of moving, rotating, resizing, changing an appearance of, translating (e.g., along an axis), ceasing to display, etc. As one example, with reference to FIGS. 3E and 3F, in response to finger manipulation data indicating a rotational gesture, the electronic device 310 correspondingly rotates the computer-generated cube 332. As another example, with reference to FIGS. 3N and 3O, in response to finger manipulation data indicating a tap gesture 360, the electronic device 310 changes the color of the computer-generated basketball 334. As yet another example, with reference to FIGS. 3N-3P, in response to extremity indicator values indicating a leftward movement of the second hand 54 of the user 50 (as indicated by the movement line 359), the electronic device 310 correspondingly moves the computer-generated basketball 334 leftwards.

Figure 7:
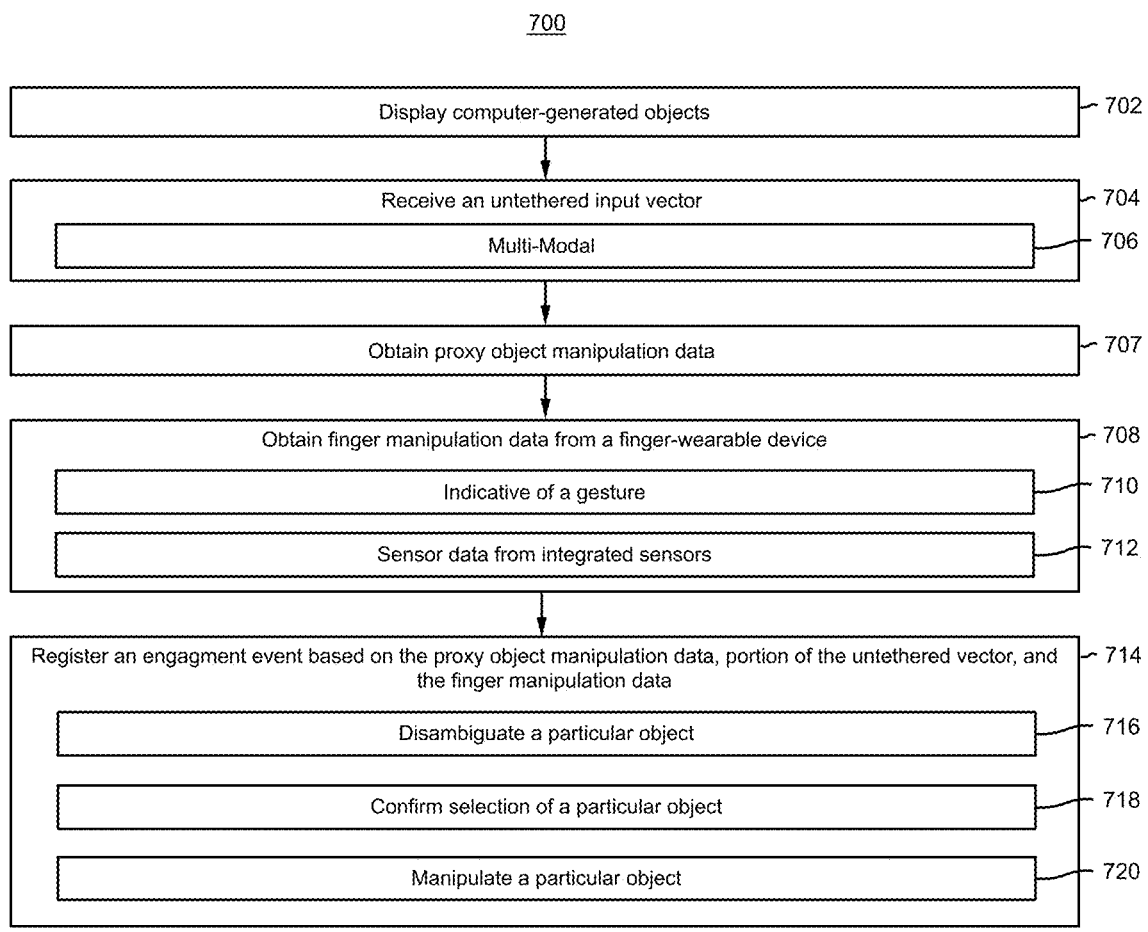
FIG. 7 is an example of a flow diagram of a method of registering engagement events based on finger manipulation data, untethered inputs, and proxy object manipulation data in accordance with some implementations.

FIG. 7 is an example of a flow diagram of a method 700 of registering engagement events based on finger manipulation data, untethered inputs, and proxy object manipulation data in accordance with some implementations. In various implementations, the method 700 or portions thereof are performed by an electronic device (e.g., the electronic device 100 in FIG. 1 or the electronic device 310 in FIGS. 3A-3V). In various implementations, the method 700 or portions thereof are performed by a head-mountable device (HMD). In some implementations, the method 700 is performed by processing logic, including hardware, firmware, software, or a combination thereof. In some implementations, the method 700 is performed by a processor executing code stored in a non-transitory computer-readable medium (e.g., a memory). In various implementations, some operations in method 700 are, optionally, combined, the order of some operations is, optionally, changed, and/or some operations are, optionally, omitted.

As represented by block 702, the method 700 includes displaying, on a display, a plurality of computer-generated objects. For example, with reference FIG. 3B, the electronic device 310 displays, on the display 312, the computer-generated soccer ball 330, the computer-generated cube 332, and the computer-generated basketball 334.

As represented by block 704, the method 700 includes receiving, via an untethered input detection system, an untethered input vector that includes a plurality of untethered input indicator values. For example, with reference to FIG. 4, the untethered input detection system corresponds to the untethered input detection system 430. As another example, as described with reference to FIGS. 3A-3V, the electronic device 310 receives various untethered indicator values. As represented by block 706, each of the plurality of untethered input indicator values is associated with one of a plurality of untethered input modalities. For example, with reference to FIG. 5, the plurality of untethered input modalities includes a combination of an eye tracking modality 512, extremity tracking modality 514, a voice detection modality 516, and a proxy object tracking modality 518. As one example, with reference to FIGS. 3R-3V, the electronic device 310 obtains, via the proxy object identifier 384, one or more proxy object tracking indicator values. Moreover, the electronic device 310 identifies the physical car 380 based on the one or more proxy object tracking indicator values.

As represented by block 707, in some implementations, the method 700 includes obtaining proxy object manipulation data from a physical proxy object via the communication interface. For example, with reference to FIGS. 3Q-3V, the electronic device 310 obtains various types of proxy object manipulation data from the physical proxy object 380 when the physical proxy object 380 includes sensor(s). The proxy object manipulation data may indicate positional (e.g., 6 degrees of freedom (DOF)) information associated with the physical proxy device within a performance threshold. In some implementations, based on obtaining the proxy object manipulation data, method 700 forgoes receiving an untethered input vector (which is represented by block 704).

As represented by block 708, the method 700 includes obtaining finger manipulation data from a finger-wearable device via a communication interface. For example, with reference to FIGS. 3A-3V, the electronic device 310 obtains various types of finger manipulation data from the finger-wearable device 320. The finger manipulation data may indicate positional (e.g., 6 degrees of freedom) and contact intensity (e.g., force or pressure) information of the finger-wearable device within a performance threshold. In some implementations, as represented by block 710, the finger manipulation data is indicative of a gesture performed by the finger-wearable device. For example, the gesture interpretation system 236 in FIG. 2 and the gesture interpretation subsystem 445 in FIG. 4 operate independently or together in order determine (e.g., identify) the gesture based on the finger manipulation data.

In some implementations, as represented by block 712, the finger manipulation data corresponds to sensor data associated with one or more sensors integrated within the finger-wearable device. For example, in some implementations, the sensor data includes positional data output from one or more positional sensors integrated in the finger-wearable device. As one example, the positional data is indicative of a rotational movement or translational movement of the finger-wearable device, such as is illustrated in FIGS. 3E, 3F, 3J, and 3K. The positional data may include inertial measurement unit (IMU) data (e.g., 3D rotational data) associated with an IMU that is integrated within the finger-wearable device. The positional data may also include magnetic sensor data (e.g., 3D positional data) associated with a magnetic sensor that is integrated within the finger-wearable device, wherein the magnetic sensor senses weak magnetic fields.

As another example, in some implementations, the sensor data includes contact intensity data output from a contact intensity sensor integrated in the finger-wearable device, such as in connection with the tap gesture 360 on the physical table 302 illustrated in FIGS. 3N and 3O. As one example, the contact intensity data includes interferometer data that is indicative of tap pressure associated with a gesture that is performed by the finger-wearable device. The interferometer data is from an interferometer that is integrated within the finger-wearable device. For example, the interferometer data indicates a pressure level associated with a finger, wearing the finger-wearable device, contacting a physical object. As one example, the finger-wearable device senses (e.g., via the contact intensity sensor) deflection of a pad of a finger when the finger contacts the physical surface. Accordingly, various implementations disclosed herein enable a user to feel a physical surface (and the texture of the physical surface) with which the user is interacting.

As yet another example, in some implementations, the sensor data includes a combination of the positional data and the contact intensity data.

As represented by block 714, the method 700 includes registering an engagement event with respect to a first one of the plurality of computer-generated objects based on at least a portion of the proxy object manipulation data, a portion of the untethered input vector, the finger manipulation data, or a combination thereof. In some implementations, registering the engagement event is based on the entirety of the untethered input vector. In some implementations, registering the engagement event is based on less than the entirety of the untethered input vector. In some implementations, registering the engagement event is a function of only the proxy object manipulation data and the finger manipulation data, and thus is independent of the untethered input vector.

As represented by block 716, in some implementations, registering the engagement event includes disambiguating the first one of the plurality of computer-generated objects based on the portion of the untethered input vector. In some implementations, disambiguating is performed by the object disambiguator 452 illustrated in FIG. 4. For example, with reference to FIGS. 3C-3G, the electronic device 310 disambiguates the computer-generated cube 332 based on eye tracking indicator value(s) included in an untethered input vector. As another example, with reference to FIGS. 3H and 3I, the electronic device 310 disambiguates the computer-generated soccer ball 330 and the computer-generated basketball 334 based on voice detection indicator value(s) associated with speech "Select the balls" 348. As yet another example, with reference to FIGS. 3L and 3M, the electronic device 310 disambiguates the computer-generated basketball 334 based on extremity tracking indicator value(s) associated with the second hand 54 of the user 50.

In some implementations, disambiguating the first one of the plurality of computer-generated objects is based on a proximity threshold and/or a time threshold. To that end, the method 700 includes determining a respective location based on the portion of the untethered input vector. Disambiguating the first one of the plurality of computer-generated objects includes determining that the respective location satisfies a proximity threshold with respect to the first one of the plurality of computer-generated objects. For example, an electronic device determines that a position indicator value (e.g., extremity position indicator value or eye gaze indicator value) indicates that the position of a user's hand or user's eye gaze is focused on a location of the display that is proximate to the first one of the plurality of computer-generated objects. In some implementations, disambiguating the first one of the plurality of computer-generated objects includes determining that the respective location satisfies the proximity threshold for a threshold amount of time.

As represented by block 718, in some implementations, registering the engagement event includes confirming a disambiguation of the first one of the plurality of computer-generated objects. For example, after disambiguating a particular computer-generated object based on an eye tracking indicator value, an electronic device displays an affordance to enable confirmation of the disambiguation. Continuing with this example, the affordance may include text corresponding to "You are looking at the floating basketball. Please double tap in order to confirm selection of the basketball."

As represented by block 720, in some implementations, registering the engagement event includes manipulating the first one of the plurality of computer-generated objects. In some implementations, manipulating is performed by the object manipulator 454 illustrated in FIG. 4. For example, manipulating may include one or more of moving, rotating, resizing, changing an appearance of, translating (e.g., along an axis), ceasing to display, etc. As one example, with reference to FIGS. 3E and 3F, in response to finger manipulation data indicating a rotational gesture, the electronic device 310 correspondingly rotates the computer-generated cube 332. As another example, with reference to FIGS. 3N and 3O, in response to finger manipulation data indicating a tap gesture 360, the electronic device 310 changes the color of the computer-generated basketball 334. As yet another example, with reference to FIGS. 3N-3P, in response to extremity indicator values indicating a leftward movement of the second hand 54 of the user 50 (as indicated by the movement line 359), the electronic device 310 correspondingly moves the computer-generated basketball 334 leftwards. As yet another example, with reference to FIGS. 3R-3V, based on a combination of finger manipulation data, proxy object tracking, and/or proxy object manipulation data, the electronic device 310 associates the physical car 380 with the computer-generated cube 332, and manipulates the computer-generated cube 332 based on a corresponding manipulation (e.g., rotation, translation movement along an axis, etc.) of the physical car 380. In some implementations, a physical proxy object includes one or more sensors that output proxy object manipulation data to the electronic device 310, which, in turn manipulates a currently selected computer-generated object.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at an electronic device with one or more processors, a non-transitory memory, a display, an untethered input detection system, and a communication interface provided to communicate with a finger-wearable device:
displaying, on the display, a plurality of computer-generated objects;
receiving, via the untethered input detection system, an untethered input vector that includes a plurality of untethered input indicator values, wherein each of the plurality of untethered input indicator values is associated with one of a plurality of untethered input modalities;
obtaining finger manipulation data from the finger-wearable device via the communication interface; and
registering an engagement event with respect to a first one of the plurality of computer-generated objects based on at least a portion of the untethered input vector and the finger manipulation data.

2. The method of claim 1, wherein registering the engagement event is a function of an entirety of the untethered input vector.

3. The method of claim 1, wherein registering the engagement event includes disambiguating the first one of the plurality of computer-generated objects based on the portion of the untethered input vector.

4. The method of claim 3, further comprising determining a respective location based on a function of the portion of the untethered input vector, wherein disambiguating the first one of the plurality of computer-generated objects includes determining that the respective location satisfies a proximity threshold with respect to the first one of the plurality of computer-generated objects.

5. The method of claim 1, wherein the untethered input detection system includes an eye tracking subsystem that outputs one or more eye tracking indicator values, wherein the one or more eye tracking indicator values are associated with an eye tracking modality of the plurality of untethered input modalities, and wherein registering the engagement event is based on the one or more eye tracking indicator values.

6. The method of claim 1, wherein the untethered input detection system includes an extremity tracking subsystem that outputs one or more extremity tracking indicator values, wherein the one or more extremity tracking indicator values are associated with an extremity tracking modality of the plurality of untethered input modalities, and wherein registering the engagement event is based on the one or more extremity tracking indicator values.

7. The method of claim 1, wherein the untethered input detection system includes a voice detection subsystem that outputs one or more voice detection indicator values, wherein the one or more voice detection indicator values are associated with a voice detection modality of the plurality of untethered input modalities, and wherein registering the engagement event is based on the one or more voice detection indicator values.

8. The method of claim 1, wherein the finger manipulation data is indicative of a gesture performed via the finger-wearable device.

9. The method of claim 1, wherein registering the engagement event includes confirming a selection of the first one of the plurality of computer-generated objects.

10. The method of claim 1, wherein registering the engagement event includes manipulating the first one of the plurality of computer-generated objects.

11. The method of claim 1, wherein the finger manipulation data corresponds to sensor data associated with one or more sensors integrated within the finger-wearable device.

12. The method of claim 1, further comprising identifying a physical proxy object based on the untethered input vector.

13. The method of claim 12, wherein the untethered input detection system includes a proxy object identifier that outputs one or more proxy object tracking indicator values, and wherein identifying the physical proxy object is based on the one or more proxy object tracking indicator values.

14. The method of claim 12, wherein registering the engagement event with respect to the first one of the plurality of computer-generated objects includes associating the physical proxy object with the first one of the plurality of computer-generated objects.

15. The method of claim 12, wherein the communication interface is provided to communicate with the physical proxy object, the method further comprising obtaining proxy object manipulation data from the physical proxy object via the communication interface, wherein registering the engagement event with respect to the first one of the plurality of computer-generated objects includes manipulating the first one of the plurality of computer-generated objects based on the proxy object manipulation data.

16. The method of claim 15, wherein the proxy object manipulation data corresponds to sensor data associated with one or more sensors integrated within the physical proxy object.

17. A system comprising:
one or more processors;
a non-transitory memory;
a display to display a plurality of computer-generated objects;
an untethered input detection system to receive an untethered input vector that includes a plurality of untethered input indicator values, wherein each of the plurality of untethered input indicator values is associated with one of a plurality of untethered input modalities;
a communication interface to obtain finger manipulation data from a finger-wearable device; and
an engagement event detector to register an engagement event with respect to a first one of the plurality of computer-generated objects based on at least a portion of the untethered input vector and the finger manipulation data.

18. The system of claim 17, wherein the finger manipulation data corresponds to sensor data associated with one or more sensors integrated within the finger-wearable device.

19. The system of claim 17, wherein the system corresponds to a head-mountable device (HMD).

20. A non-transitory computer readable storage medium storing one or more programs, the one or more programs comprising instructions, which, when executed by an electronic device with one or more processors, a display, an untethered input detection system and a communication interface provided to communicate with a finger-wearable device, cause the electronic device to:
display, on the display, a plurality of computer-generated objects;
receive, via the untethered input detection system, an untethered input vector that includes a plurality of untethered input indicator values, wherein each of the plurality of untethered input indicator values is associated with one of a plurality of untethered input modalities;
obtain finger manipulation data from the finger-wearable device via the communication interface; and
register an engagement event with respect to a first one of the plurality of computer-generated objects based on at least a portion of the untethered input vector and the finger manipulation data.

* * * * *